United States Patent
Motoyoshi et al.

(10) Patent No.: US 6,356,721 B1
(45) Date of Patent: Mar. 12, 2002

(54) IMAGE FORMING APPARATUS HAVING CONTROLLER WHICH CONTROLS JOBS INCLUDING IMAGE FORMING PROCESSING AND WHICH EXECUTES JOBS IN SUCCESSION

(75) Inventors: Tomoya Motoyoshi; Kazuhisa Maruyama; Motoki Nakamichi, all of Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/659,769

(22) Filed: Sep. 11, 2000

(30) Foreign Application Priority Data

Sep. 13, 1999 (JP) ............................................. 11-259257

(51) Int. Cl.[7] .............................................. G03G 15/00
(52) U.S. Cl. ............................... 399/82; 399/85; 399/87
(58) Field of Search ................................ 358/296, 437, 358/444; 399/82, 83, 85, 87

(56) References Cited

U.S. PATENT DOCUMENTS 5,880,851 A * 3/1999 Imada ......................... 358/296

* cited by examiner

Primary Examiner—Arthur T. Grimley
Assistant Examiner—Hoang Ngo
(74) Attorney, Agent, or Firm—Frishauf, Holtz, Goodman, Langer & Chick, P.C.

(57) ABSTRACT

There is described an image forming apparatus favorably applied to a copying machine equipped with a control function for jobs including image forming processing. The image forming apparatus includes an image forming section to form an image, a sheet-feeding/conveyance section to convey a recording sheet, a controlling section to control the image forming section and the sheet-feeding/conveyance section and a memorizing section to memorize jobs reserved for an image forming processing. The image forming processing for one of the jobs includes a startup operation, an image forming operation and a terminating operation. When the memorizing section memorizes a next job to be executed next to a current job, which is currently executed in the image forming apparatus, the controlling section controls the image forming processing so as to perform the image forming operation for the next job succeeding to that for the current job, without performing the terminating operation for the current job and the startup operation for the next job.

10 Claims, 16 Drawing Sheets

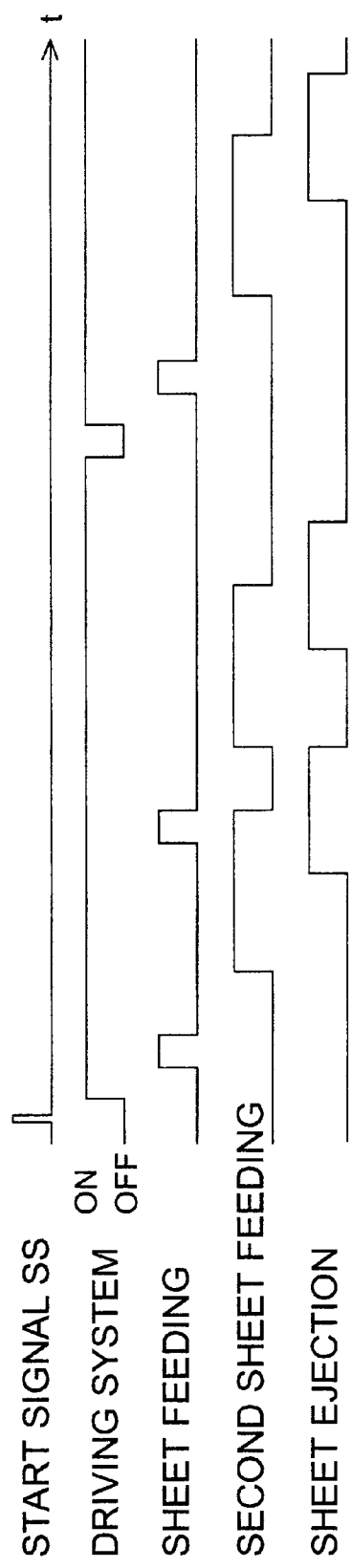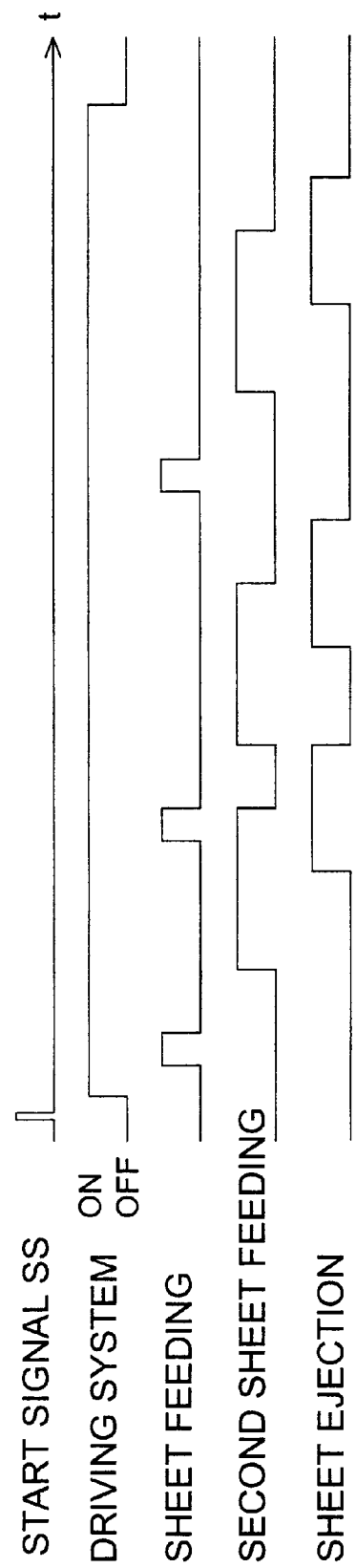

FIG. 13

CONTENTS ARE SELECTED WHEN THEY ARE CONFIRMED.
WHEN EXECUTING HYSTERESIS JOB, EXECUTION IS SELECTED
AFTER INPUTTING PASSWORD.

1. JOB1  FILE  CONTENTS  PASSWORD ____  EXECUTION
2. JOB2  FILE  CONTENTS  PASSWORD ____  EXECUTION
3. JOB3  FILE  CONTENTS  PASSWORD ____  EXECUTION
4. JOB4  FILE  CONTENTS  PASSWORD ____  EXECUTION

FIG. 14

IMAGE ON THE FIRST PAGE OF HYSTERESIS JOB 1.

JOB EXECUTED AT ○ HOUR ON ○ DAY IN MONTH OF ○ IN YEAR OF ○

DOCUMENT

MR. ○

FRONT IMAGE PLANE

IMAGE FORMING APPARATUS HAVING CONTROLLER WHICH CONTROLS JOBS INCLUDING IMAGE FORMING PROCESSING AND WHICH EXECUTES JOBS IN SUCCESSION

BACKGROUND OF THE INVENTION

The present invention relates to an image forming apparatus favorably applied to a copying machine equipped with a control function for jobs including image forming processing and to a compound machine having a copying function, a printer function and a facsimile function.

To be more precise, the image forming apparatus of the invention is one which is equipped with a control means that controls jobs including image forming processing and executes the jobs in succession, and can execute continuously image forming processing for the reserved and registered job, when another job is reserved and registered after the job that is being executed presently, by following the recording sheet for image forming processing for the last page in the concerned job, without stopping, at each termination of the job being executed presently, the driving systems such as a developing unit, a drum and a conveyance belt all relating to the image forming processing.

Incidentally, in the invention, the job means a series of operations relating to image forming, and it covers a range from a startup operation conducted in advance to image forming operations to a termination operation conducted after the image forming operations. For example, when copying images of plural sheets of documents, a series of operations relating to plural sheets of copies are regarded as one job, and when making copies of plural sets, a series of operations relating to copies of plural sets are regarded as one job.

A digital copying machine which forms images based on image data obtained from images of a document has come to be used lately. In this copying machine, image information of a document is read by a scanner or the like, and then, image information of the document is stored temporarily in an image memory. Then, the image information stored in the image memory is subjected to image processing such as image reduction, image enlargement and image rotation, in accordance with user's demands. Then, images based on the image data subjected to the image processing are formed on a prescribed transfer sheet by an image forming means (printer). As a result, it is possible to copy the images of the document.

Further, there is available on the market a compound machine wherein the aforesaid digital copying function, facsimile function and printer function are compounded, and a printer is shared by the aforesaid three functions, while, an image reading means (scanner) is shared by the copying function and the facsimile function.

FIG. 17 is a block diagram showing a structure example of compound machine 10 of this type. Compound machine 10 shown in FIG. 17 has data bus 1. To this data bus 1, there are connected communication modem 2, coding section 3, scanner 4, image processing section 5, data communication section 6, image memory 7, printer 8 and control section 9. To this control section 9, there are connected operation section 9A and display section 9B. In compound machine 10 of this type, image memory 7 is divided into copy area 7A and FAX area 7B.

In the copying function, the copy area 7A is used, and document image data obtained through reading by scanner 4 are compressed and then are stored. In the facsimile function, the FAX area 7B is used, and image data sent from a target are decoded by coding section 3 after being received by communication modem 2, and then, are recorded on t he FAX area 7B assigned for the facsimile function.

In the printer function, the copy area 7A is used, image data coming from a computer are subjected to prescribed image processing at image processing section 5 after being received by data communication section 6. With regard to the copy area 7A and the FAX area 7B, when capacities of both of them are compared, the greater capacity is assigned to the copy area 7A in many cases, though this is affected by easiness of operations.

The image data stored in image memory 7 are extended and then are subjected to prescribed image processing in image processing section 5 to be outputted to printer 8. In the printer 8, image data are transferred onto a recording sheet on a one page unit basis so that an image is formed. With regard to image forming processing on the recording sheet, when conducting plural print jobs continuously, print jobs are registered in a memory in advance so that each job is controlled.

For example, when the first print job is started in step D1 of the flow chart shown in FIG. 18, the driving (load) systems such as a photoreceptor drum and a conveyance motor are turned on in step D2. After that, its print job is started in step D3, and when a print for the last page concerning the aforesaid print job is completed in step D4, the driving systems are turned off. After that, when the print job is completed, it is checked, in step D7, whether the next job is registered or not. If the next job is registered, the sequence goes back to step D1, and step D2–step D6 mentioned above are executed repeatedly. If the next job is not registered, the image forming control is ended.

Incidentally, the following problems are caused by conventional compound machine 10. When conducting plural jobs continuously, productivity of images was not so good, because startup operations for the succeeding job were conducted after termination operations for the preceding job were conducted. In the case of an electro-photographic apparatus, for example, a rotation-stopping operation to stop rotation of a photoreceptor, an operation to neutralizing the surface of the photoreceptor for preventing deterioration of the photoreceptor, an operation to turn off the power supply for a charging unit and an operation to turn off the power supply for a sheet feeding motor are included in the termination operations. Further, a rotation-starting operation to start rotation of a photoreceptor, an operation to turn on the power supply for a charging unit and an operation to turn on the power supply for a sheet feeding motor are included in the startup operations. In the case of the startup operation, it requires a period of time covering from the start of rotation of the photoreceptor to the stabilization of the rotation, while, in the case of the termination operation, a period of time required for the termination operation is long because the operation is actually started after the last sheet has been ejected out of the machine completely, from the viewpoint of measures for jamming, although the time required for the termination operation only is not so long. The time required for both the startup operations and the termination operations is about 6–8 seconds in total, in the case of a copying machine of, for example, 20 30 CPM. Since this time is added when each job is switched, the total time is longer when the number of jobs to be conducted continuously is increased, thus, productivity has been reduced.

SUMMARY OF THE INVENTION

So, an object of the invention is to solve the problems stated above, and thereby to improve a control method for plural continuous jobs for image forming to provide an image forming apparatus capable of improving productivity of image forming.

Accordingly, to overcome the cited shortcomings, the abovementioned object of the present invention can be attained by an image forming apparatus, comprising: an image forming section to form an image; a sheet-feeding/conveyance section to convey a recording sheet; a controlling section to control the image forming section and the sheet-feeding/conveyance section; and a memorizing section to memorize jobs reserved for an image forming processing, wherein the image forming processing for one of the jobs includes a startup operation, an image forming operation and a terminating operation, and, when the memorizing section memorizes a next job to be executed next to a current job, which is currently executed in the image forming apparatus, the controlling section controls the image forming processing so as to perform the image forming operation for the next job succeeding to that for the current job, without performing the terminating operation for the current job and the startup operation for the next job.

Further, to solve the aforesaid problems, the image forming apparatus of the invention has therein a registration means in which plural jobs including image forming processing are registered and a control means which controls reservation of the jobs registered in the registration means and executes successively the jobs registered in the registration means, and is characterized in that the control means starts the job for registering reservation in the course of image forming processing for the last page in the concerned job, when another job is reserved and registered after the job that is being executed currently in the registration means, and controls the feeding of the first sheet in the job relating to reservation registration, following the recording sheet for image forming processing for the last page in the concerned job.

In the image forming apparatus of the invention, when plural jobs including image forming processing are registered in the registration means, reservation of the jobs registered in the registration means is controlled by the control means, and the jobs registered in the registration means are executed in succession. When another job is reserved and registered after the job being executed currently, the job relating to the reservation and registration is prepared in the course of image forming processing for the last page in the concerned job, and the feeding of the first sheet in the job relating to the reservation and registration is controlled by the control means, following the recording sheet for image forming processing for the last page in the concerned job.

Accordingly, it is possible to conduct image forming processing for the reserved and registered job continuously, following the recording sheet subjected to image forming processing for the last page in the concerned job, without stopping driving systems such as a developing unit, a drum and a conveyance belt all related to image forming processing at each termination of the job being executed currently.

BRIEF DESCRIPTION OF THE DRAWINGS

FIGS. 7(A) and 7(B) are time charts showing examples is a time chart showing an example of comparison of control for driving systems between a conventional type symbolized with A and a type of the invention symbolized with B.

FIG. 13 is an image diagram showing an example of display by display means 21 of compound machine 100 representing the third embodiment.

FIG. 14 is an image diagram showing an example of display of file names relating to hysteresis job 1.

DETAILED DESCRIPTION OF THE PREFERRED EMBODIMENT

Figure 1:
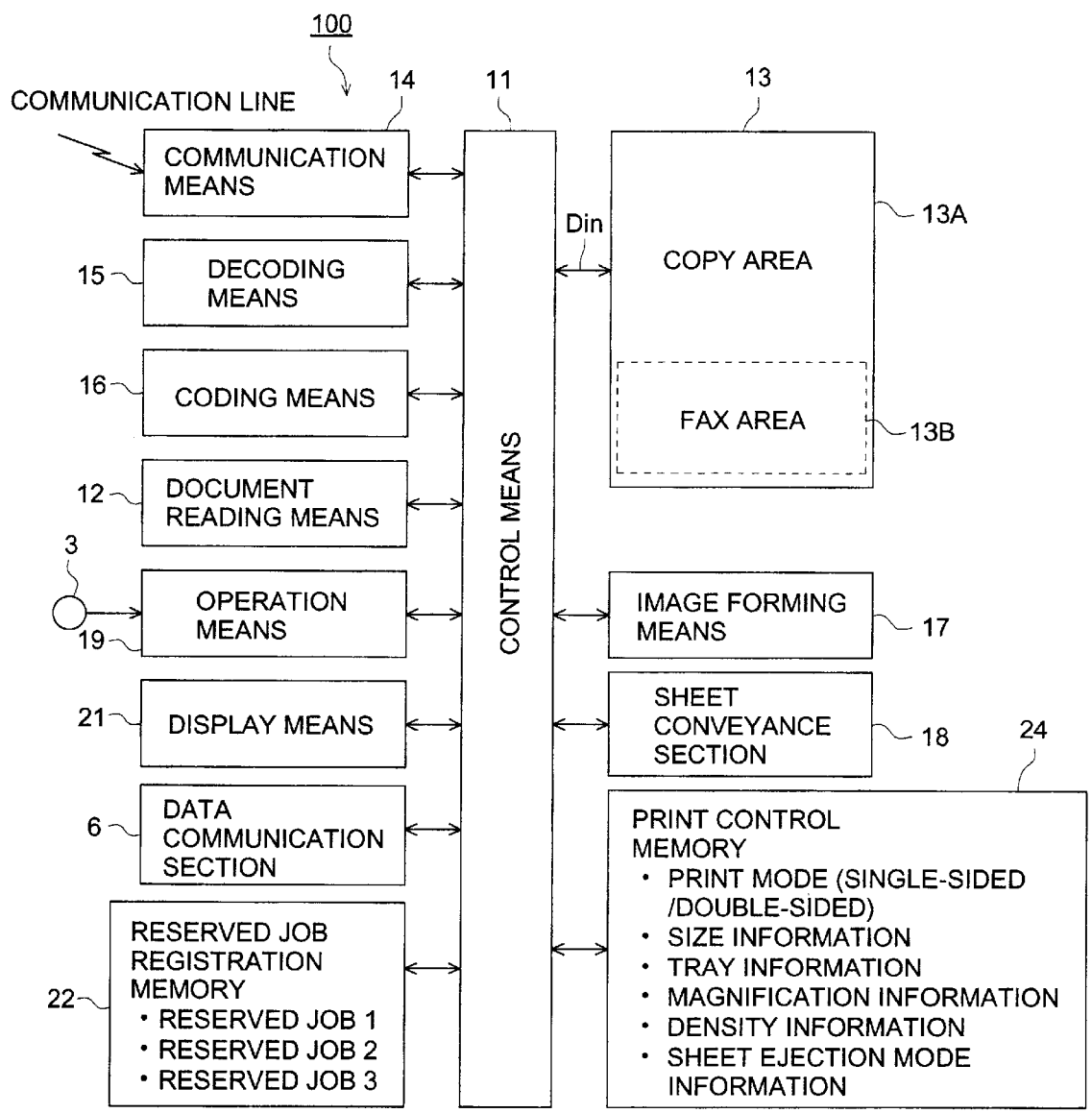
FIG. 1 is a block diagram showing an example of structure of compound machine 100 to which the first image forming apparatus representing each embodiment of the invention is applied.

An image forming apparatus relating to each embodiment of the invention will be explained as follows, referring to the drawings.

(1) First Embodiment

FIG. 1 is a block diagram showing an example of structure of compound machine 100 to which the first image forming apparatus representing each embodiment of the invention is applied.

The image forming apparatus in the present embodiment is equipped with a control means that controls jobs including image forming processing and executes the jobs in succession, and can execute continuously image forming processing for the reserved and registered job, when another job is reserved and registered after the job that is being executed presently, by following the recording sheet subjected to image forming processing for the last page in the concerned job, without stopping, at each termination of the job being executed presently, the driving systems such as a developing unit, a drum and a conveyance belt all relating to the image forming processing.

The compound machine 100 is one to which the image forming apparatus of the invention is applied, and it has a copying function, a facsimile function and a printer function. The compound machine 100 shown in FIG. 1 is equipped with control means 11. Reserved job registration memory 22 serving as a registration means is connected with the control means 11 so that plural jobs (job 1, job 2, job 3 . . . and so forth) including image forming processing may be registered. Jobs including image forming processing are controlled on a basis of one page unit of document images. One job requires one page (single slip) to be finished in one case, while, it requires plural pages to be finished in another case. For the registration means, a nonvolatile memory such as EEPROM (read only memory capable of doing electric writing and erasing) is used.

Reservation of a job is conducted by the setting operation of a user. For example, there are given some occasions including an occasion to make copies in desired quantity of document images by selecting a copying function, an occasion to print out all received images relating to memory reception by selecting a facsimile function and an occasion to select a printer function and thereby to copy CG images received from an outer computer.

The control means 11 controls so that the situation of reservation of the jobs registered in the reserved job registration memory 22 are controlled and the jobs registered in the reserved job registration memory 22 are executed in succession. For example, when a job is reserved and registered after the job that is being executed presently in the reserved job registration memory 22, the control means 11 starts the reserved and registered job in the course of image forming processing for the last page of the concerned job, and controls to feed the first sheet in the preserved and registered job, following the recording sheet subjected to image forming processing for the last page in the concerned job. The reason for the foregoing is to perform image forming processing continuously for the reserved and registered job following the recording sheet subjected to image forming processing for the last page in the concerned job, without stopping, at each termination of the job being executed presently, the driving systems such as a developing unit, a photoreceptor drum and a conveyance belt all relating to the image forming processing. With regard to an example of controlling these reserved jobs, it will be explained in FIG. 3.

To this control means 11, there are connected document reading means 12, an image memory, communication means 14, decoding means 15, symbolizing means 16, image forming means 17, sheet-feeding/conveyance section 18, operation means 19, display means 21, print control memory 24 and data communication section 6, in addition to the reserved job registration memory 22 stated above.

In the document reading means 12, a copying function or a facsimile function is selected by operation means 19, and when the operation condition is established, images of a document are read based on the operation condition and document image data are generated. For the document reading means 12, an automatic document reading apparatus (scanner) and others are used. Through the control means 11, the document reading means 12 is connected with image memory 13 wherein copy area 13A is assigned for the copying function and FAX area 13B is assigned for the facsimile function.

On the copy area 13A, there is mainly stored document image data obtained through reading by the document reading means 12. In this example, a memory area assigned to copy area 13A is greater in terms of capacity than that assigned to FAX area 13B. In addition to document image data, image data for print use are stored temporarily on copy area 13A. For the image memory 13, it is recommended to use DRAM which requires memory preserving operations. It is naturally preferable to have a backup power supply. Memory capacity of about 16 M bytes in total, for example, is prepared for the image memory 13. Some 14 M bytes (equivalent to 20 sheets in A3 size) are assigned to the copy area 13A as a standard, and 2 M bytes are assigned to the FAX area 13B.

Further, in the communication means 14 connected to the control means 11, a facsimile function is selected, and when the operation condition is established, data communication is conducted in accordance with prescribed communication control procedures based on the operation condition. On the communication means 14, there is provided a network control unit, and between the network control unit and a public network such as NTT, there are conducted calling from the compound machine 100, incoming call from many and unspecified targets, and connection control such as reverting and disconnection. For example, ring detection is conducted by the network control unit, and request to send which is called by the target is received.

On the communication means 14, there is provided an unillustrated communication modem which demodulates modulation signals transmitted through a public network and thereby converts them into digital receipt image data in the course of receipt, and modulates document image data so that they may be adjusted to the frequency band of a public network and thereby converts them into modulation signals in the course of transmission. Received image data received by the communication means 14 are stored in the FAX area 13B.

Decoding means 15 is connected to the communication means 14 through control means 11, and thereby, received image data are decoded and extended in the course of receipt. Symbolizing means 16 is connected to the communication means 14 through control means 11, and thereby, document image data are compressed and symbolized in the course of transmission.

Image forming means 17 is connected to control means 11, and a copying function, a facsimile function or a printer function is selected, and when the operation condition is established, an image is formed on a recording sheet, in accordance with the operation condition, based on document image data stored in copy area 13A or on received image data stored in FAX area 13B. The image forming means 17 has therein an unillustrated recording sheet loading unit (tray), a developing unit, a photoreceptor drum, a fixing unit and a cartridge. With regard to the image forming means 17, an example thereof will be explained together with an automatic document feeding/reading apparatus, in FIG. 4.

To drive the image forming means 17, sheet conveyance section 18, display means 21 and print control memory 24 are connected to the control means 11. In the sheet conveyance section 18, a sheet in the prescribed size is conveyed from the recording sheet loading unit to the image forming system. In the print control memory 24, there are stored print modes (single-sided/double-sided), information of sheet sizes, information of trays therefor, information of copy magnifications, information of copy density and information of sheet ejection modes all established by a user by the use of operation means 19. These pieces of information are displayed on a display image plane of the display means 21 as established items. Since the data communication section 6 has a function identical to that in a conventional example, explanation thereof is omitted here.

Figure 2:
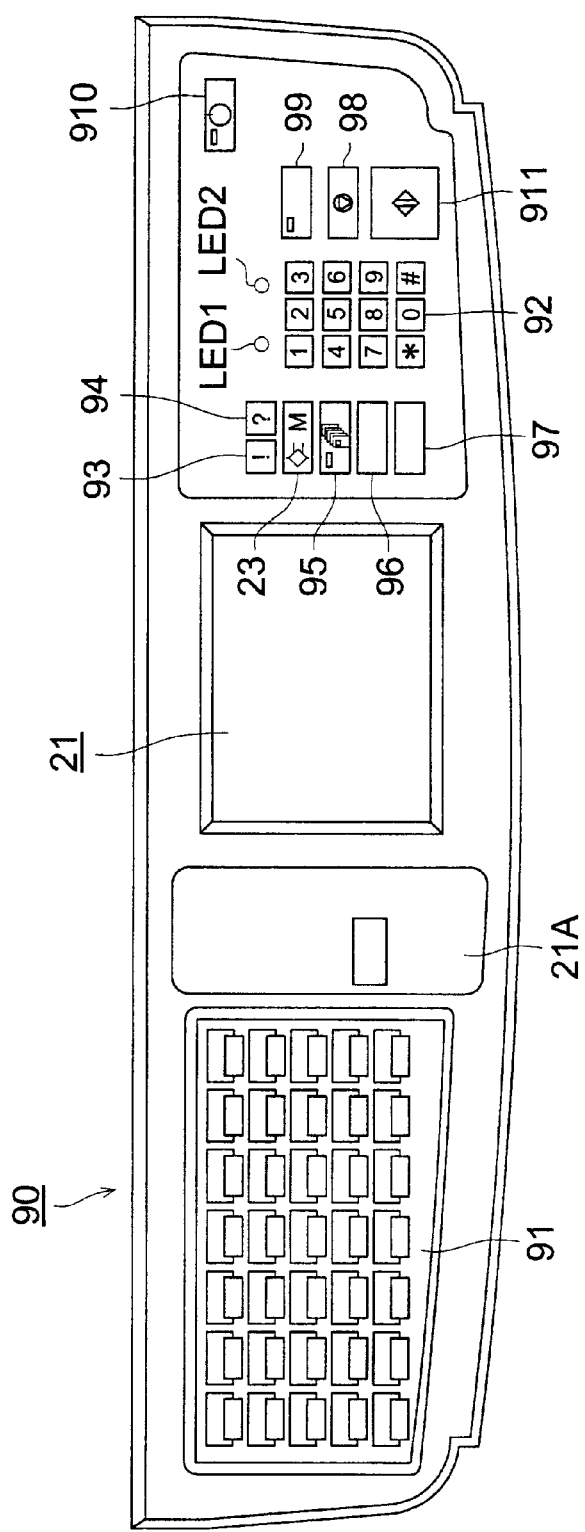
FIG. 2 is a diagram wherein an example of structure of operation panel 90 of the compound machine 100 is viewed from the top portion.

Next, operation panel 90 representing an example of operation means 19 will be explained. Operation panel 90 shown in FIG. 2 has a rectangular shape wherein corners on one side are rounded, and is mounted at the position in the vicinity of this side of document reading means (not shown) 12 of the concerned copying machine 100, so that a user can operate easily.

On the operation panel 90, there are provided at least display means 21 and mode change key 23. In the present example, a liquid crystal display (LCD) is used for the display means 21. In addition to this, a plane display element such as PDP or an electroluminescence diode may also be used, and each of these display units is located mostly at the center of the operation panel 90. For easier input operations of a user, a touch panel is mounted on a display image plane on the display means 21.

In addition to this, there are arranged push button switches 91 for single-touch dialing on the left side of the display means 21, so that a specific communication mode such as a single-touch transmission and a multi-destination delivery may be executed. On the right side of the display means 21, there is provided mode change key 23 for switching a mode, and for example, in accordance with operations of the mode change key 23, an image plane for establishment of copying function operation, an image plane for establishment of facsimile function operation and an image plane for establishment of printer function operation are successively displayed on the display means 21 on a rotation display basis.

Furthermore, on the right side of the display means 21, there are arranged a ten-key including numerals "1"–"0", key button 92 for inputting telephone numbers such as a key and a "#" key, check button 93, help button 94, application button 95, program button 96, reset button 97, stop/clear button 98, interruption copy button 99, power supply switch 910 and start button 911, in addition to the mode change key 23. There are arranged two light emitting diodes LED1 and LED2 above an arrangement area for numerals "1"–"3" of the ten-key so that a display that distinguishes between file and error may be indicated.

Figure 3:
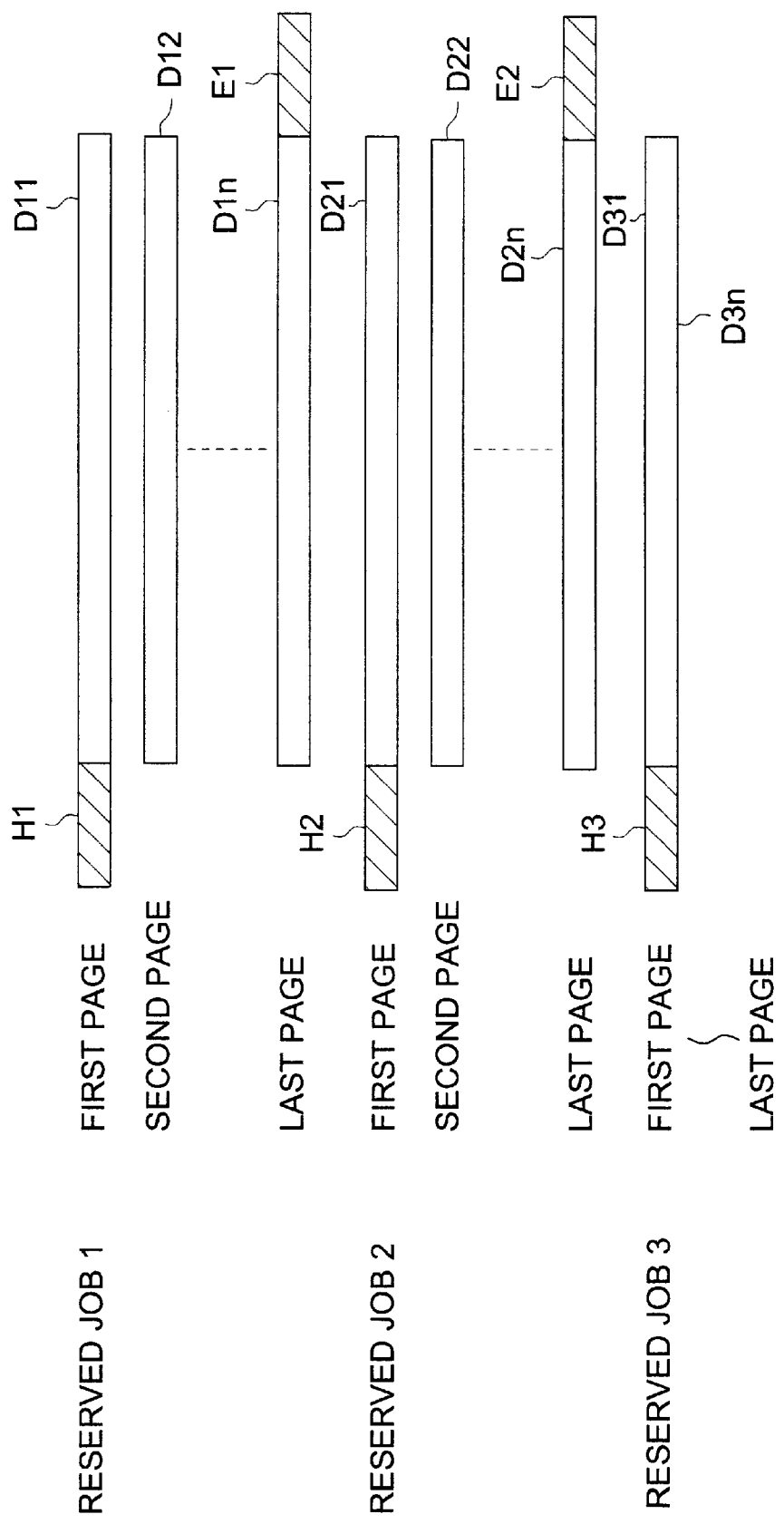
FIG. 3 is an image diagram of a data sequence showing an example of registration of reserved jobs relating to the compound machine 100.

Next, an example of registration of reserved jobs will be explained. Reserved job 1 shown in FIG. 3 is composed of image data D11–D1n in n pages. In this example, header information H1 is added to the forefront portion of image data D11 relating to the first page, and operation establishment information is written in. The operation establishment information in this case is assumed to be information for establishing operation conditions necessary for executing a copying function, a facsimile function or a printer function. The foregoing is for executing a print job by this operation establishment information.

Further, image data D12 for the second page of reserved job 2 are registered, and in the same way, image data D1n for the last page are registered. On the end portion, for example, of the image data D1n relating to the last page, there is added end (flag) information E1. The end information E1 is assumed to be information showing the last page relating to the concerned job. Owing to this end information E1, it is possible to discriminate whether the page relating to the concerned job is last or not.

It is naturally possible to add end information E1 to each page and thereby to draw a dividing line so that non-last page is shown with flag =0 and last page is shown with flag =1. By making the control means 11 to distinguish contents of the flag, it is possible to confirm the last page of the concerned job.

In the same way, image data D21 relating to the first page with header information H2 and image data D22 of the second page are registered on reserved job 2, and in the same way, image data D2n relating to the last page are registered. Even for reserved job 3, image data D31 relating to the first page with header information H3 and image data D32 of the second page are registered, and image data D3n relating to the last page are registered in the same way.

In the present example, it is possible to recognize the last page of the concerned job by monitoring end information with the control means 11. Therefore, when job 2 is reserved and registered in reserved job registration memory 22 after the job being executed presently, for example, job 1 as another job, the control means 11 starts the reserved and registered job 2 in the course of image forming processing for the last page of the concerned job 1, and controls to feed the first sheet for the reserved and registered job 2, following the recording sheet subjected to image forming processing for the last page of the concerned job 1. It is therefore possible to execute print processing for the succeeding job 2 continuously without stopping motors for drum and conveyance, after printing for the last page of preceding job 1.

Figure 4:
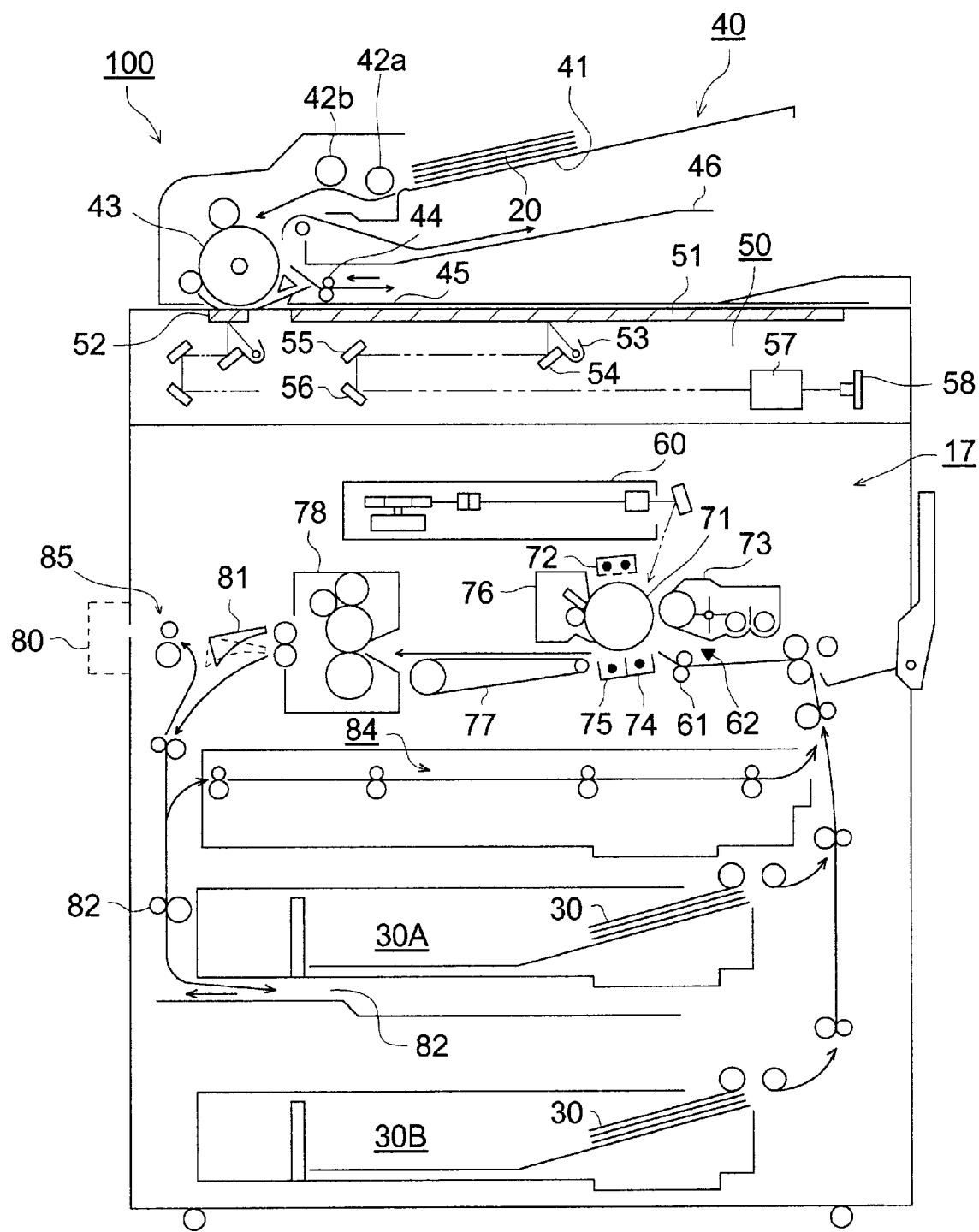
FIG. 4 is a conceptual diagram showing an example of structure of the compound machine 100.

Next, an example of structure for image forming means 17 of the concerned compound machine 100 and for automatic document feeding and reading apparatus (RADF) 40 will be explained. The automatic document feeding and reading apparatus 40 has therein document placing section 41, roller 42a, roller 42b, roller 43, reverse roller 44, reversing section 45 and sheet ejection tray 46 which are shown in FIG. 4.

Further, image reading section 50 has therein first platen glass 51, second platen glass 52, light source 53, mirrors 54, 55 and 56, image forming optical system 57, CCD image pickup unit 58 and an unillustrated optical driving system. The image forming means 17 has therein photoreceptor drum 71, charging section 72, developing section 73, transfer section 74, separation section 75, cleaning section 76, conveyance mechanism 77 and fixing section 78.

For example, plural documents 20 are placed on document placing section 41, with the surface of the first page of the document facing upward. Then, when rollers 42a and 42b are driven by an unillustrated ADF control section, the first sheet of documents 20 fed out through these rollers 42a and 42b is conveyed through roller 43.

Being controlled by an unillustrated reading control section, light is projected on an image plane of document 20 from light source 53 of image reading section 50. The reflected light is guided by mirrors 54, 55 and 56, and its reflected light is taken in CCD image pickup unit 58 through image forming optical system 57. Due to this, an image of document 20 is formed on a light-receiving plane of CCD image pickup unit 58.

When document 20 is placed on document placing section 41 over the platen glass with the surface of the document 20 to be read facing downward, a document image is taken in CCD image pickup unit 58 when scanning the optical driving system along the platen glass 51. Then, image acquisition signals $S_{in}$ of document 20 obtained through reading are transmitted from the CCD image pickup unit 58 to an unillustrated image processing circuit. In the image processing circuit, image data $D_{in}$ obtained after converting the image acquisition signals $S_{in}$ into digital data are stored in image memory 13. The image memory 13 stated above is backed up in terms of power supply, and even when the main power supply is turned off by instantaneous disconnection, image data $D_{in}$ can be backed up, thus, disappearance of precious image data $D_{in}$ obtained by reading for image compilation processing can be prevented.

Incidentally, in the case of an operation mode to feed document 20 automatically in the automatic document feeding and reading apparatus 40, document 20 rotates around roller 43. In this case, document images are read by image reading section 50 under the condition that light source 53 and mirror 54 are fixed under platen glass 52. When the first page of document 20 has been read, winding operations by roller 43 are conducted again through reverse roller 44 this time, images on the reverse side of the document are read by image reading section 50 and its image acquisition signals $S_{in}$ are outputted to the image processing circuit.

In this way, document 20 whose images on the obverse side and reverse side have been read is reversed again by reverse roller 44 to be placed on sheet ejection tray 46 with the surface of the document 20 facing downward. Simultaneously with this, image acquisition signals $S_{in}$ obtained through reading by image reading section 50 are converted into digital image data $D_{in}$ the image processing circuit, and then, are stored in image memory 13 shown in FIG. 1.

On the other hand, recording sheet 30 is fed out of sheet feeding cassette 30A or 30B wherein recording sheets 30 are loaded, and is fed to image forming means 17. The recording sheet 30 is synchronized by registration roller 61 located at an inlet, and then, is fed to photoreceptor drum 71. Sheet feeding from this registration roller 61 is called the second sheet feeding. In the vicinity of the registration roller 61, there is provided recording sheet sensor 62 which detects that the sheet has arrived at the registration roller 61.

Image data $D_{out}$ read out of image memory 13 are subjected image processing, and then, are outputted to image writing section 60. The image data $D_{out}$ are read out from an image processing section, beginning with the reverse side of each document 20. In the image writing section 60, laser beams according to image data $D_{out}$ are projected on photoreceptor drum 71 from a laser diode, and thereby, an electrostatic latent image is formed. This electrostatic latent image is developed by developing section 73 and then is formed on photoreceptor drum 71 as a toner image.

This toner image is transferred onto recording sheet 30 by transfer section 74 provided under photoreceptor drum 71. Then, the recording sheet 30 attracted to the photoreceptor drum 71 is separated from the photoreceptor drum 71 by separation section 75. After that, the recording sheet 30 separated from the photoreceptor drum 71 is conveyed to fixing section 78 through conveyance mechanism 77, and the toner image is fixed by heat and pressure in the fixing section 78. Due to this, images on the reverse side of the document (images on the second page) are formed on the recording sheet 30. Hereinafter, this is simply called an image forming process.

Further, following the image forming process for the reverse side of the document, the recording sheet 30 on which the toner image has been fixed is conveyed downward to the lower portion through guide section 81 to be fed out to reversing section 83. Next, the recording sheet 30 fed out to the reversing section 83 is fed out again upward by reverse roller 82, and is sent to image forming means 17 again through reversing conveyance path 84 provided over sheet feed cassette 30A.

At the image forming means 17 wherein image forming for the reverse side of document 20 has been finished, toner remaining on and sticking to photoreceptor drum 71 is removed by cleaning section 76 to be ready for the following image forming. Under this state, the recording sheet 30 is fed to the image forming means 17 through registration roller 61, with the obverse side (surface which has not yet been subjected to image forming) of the recording sheet 30 facing upward. In the image forming means 17, an electrostatic latent image for the obverse side of the document is formed on photoreceptor drum 71, and this electrostatic latent image is developed, thus, a toner image for the obverse side of the document is formed on the photoreceptor drum 71.

This toner image is transferred onto recording sheet 30 by transfer section 74, and thereby, images on the first page are formed on the obverse side of the recording sheet 30. The recording sheet 30 attracted to photoreceptor drum 71 is separated from the photoreceptor drum 71 by separation section 75, and then, is fed out, through conveyance mechanism 77, to fixing section 78 where the toner image is fixed by heat and pressure. Due to this, it is possible to form images (images on the first page) of the obverse side of the document on the recording sheet 30.

After that, the recording sheet 30 wherein image forming has been completed on each of its reverse side and obverse side advances to finisher section 80 where the recording sheet 30 is ejected out of the machine as it is, or it is reversed again by reversing section 83 to be ejected out of the machine by ejection roller 85, depending on output status (instruction for operations of sorter function and stapler function). Due to this, it is possible to copy images on the obverse side and the reverse side (two sides) of document 20 respectively on the obverse side and the reverse side of recording sheet 30. When forming an image only on one side of recording sheet 30, the aforesaid image forming processing relating to the second page naturally has only to be conducted. The reason why the second page is executed first in double-sided copying is to make the surface of the first page to face upward in the course of sheet ejection.

Next, an example of operations of compound machine 100 representing the first embodiment will be explained. In this example, let it be assumed that operation setting information relating to copying function is inputted by a user in advance for conducting copying of a document and printing out of FAX by memory receipt, and as reserved jobs based on the foregoing, job 1–job 3 shown in FIG. 3 such as, for example, image data relating to a copying function, image data relating to a print function and image data relating to a facsimile function are registered in reserved job registration memory 22. It is assumed that reserved job 1, job 2 and job 3 are continuously executed without stopping driving systems such as photoreceptor drum 71 and a conveyance motor on the half way.

Figure 5:
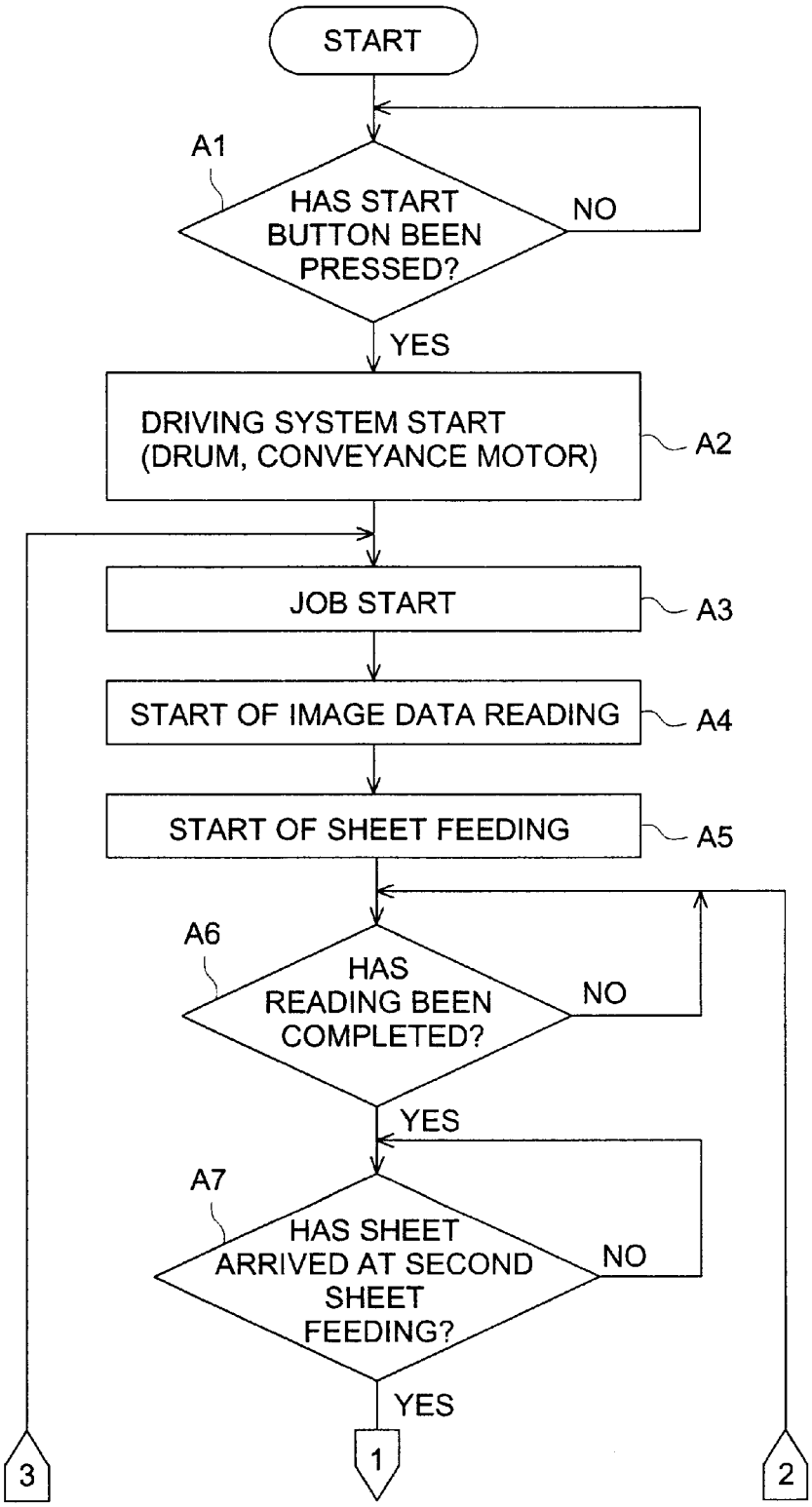
FIG. 5 is a flow chart showing an example of operations (part 1) of the compound machine 100 representing the first embodiment.
Figure 6:
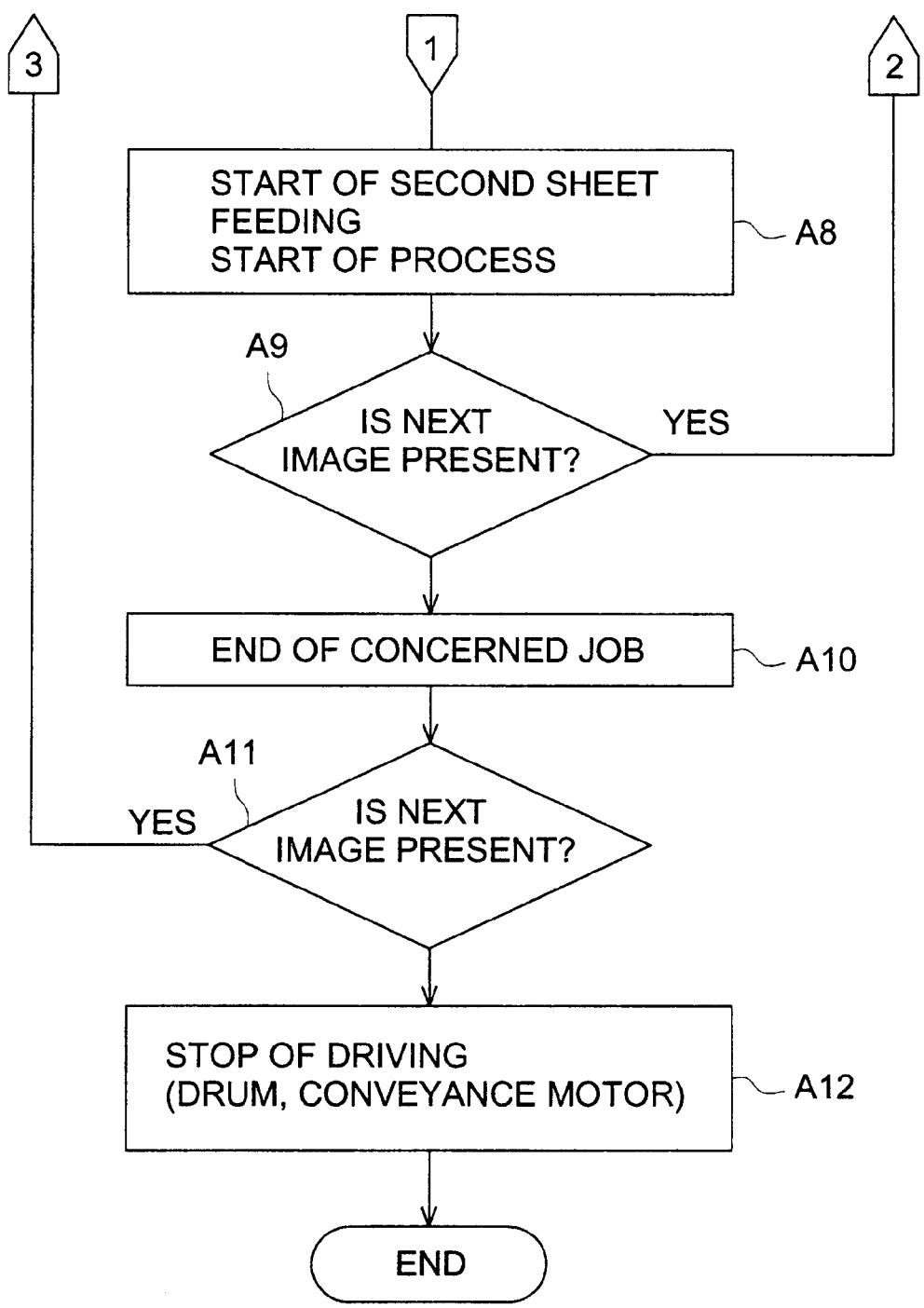
FIG. 6 is a flow chart showing an example of operations (part 2) of the compound machine 100 representing the first embodiment.

With an assumption of the foregoing, control means 11 first waits, in step A1 of the flow chart shown in FIG. 5, that start button 911 is pressed down. In this case, a user presses down start button 911 on operation panel 90 shown in FIG. 2, for conducting copying from a document and printing out of FAX. After the start button 911 is pressed down, the sequence advances to step A2 in which sheet feed cassette 30A, a driving roller, photoreceptor drum 71 and a conveyance motor all relating to job 1 are started by control means 11 to be in the idling status.

After that, operation setting conditions relating to a print function are read by control means 11 from control memory 24 in step A3. This is to start print job 1. Then, sequence advances to step A4 where reading of image data D11 relating to job 1 acquired in advance by copying function, print function or facsimile function is started. In this case, image data D11–D1n, image data D21–D2n, and image data D31–D3n relating respectively to job 1–job 3 . . . are transmitted from image memory 13 to image forming means 17. Simultaneously with this, operation setting information read out of print control memory 24 is written in header information and is transmitted to image forming means 17 from print control memory 24.

After that, control means 11 makes sheet cassette 30A to start sheet feeding of recording sheet 30 through sheet conveyance section 18. Then, in step A6, there is judged whether reading of image data relating to the concerned job has been completed or not. When the reading of the image data is not completed, the reading is continued. When the reading of the image data is completed, sequence advances to step A7 where there is detected whether recording sheet 30 has arrived at the second sheet feeding position or not. Whether the recording sheet 30 has arrived or not is detected by recording sheet sensor 62, and recording sheet detection signals are outputted to control means 11. Owing to the recording sheet detection signals, the control means 11 can detect whether the recording sheet 30 has arrived or not.

When the recording sheet 30 does not arrive at the second sheet feeding position, detection is continued until the recording sheet 30 arrives. After the detection of arrival of a sheet, the sensor is reset. When the recording sheet 30 arrives at the second sheet feeding position, the sequence advances to step A8 where the recording sheet 30 is conveyed to the position under photoreceptor drum 71, and the second sheet feeding to convey the recording sheet 30 to transfer section 74 and to fixing section 78 is started, thus, image forming process is started.

After the image forming relating to the first page is completed by the image forming process, the sequence advances to step A9 where it is judged whether image forming for the next page is intended or not. When the image forming for the next page is intended, the sequence goes back to step A6 where it is judged whether reading out of image data D12 for the next page from image memory 13 to image forming means 17 has been finished or not. When the reading out is finished, step A7–step A9 are then repeated. Therefore, when all image forming operations relating to the concerned job 1 are completed in step A9, the sequence advances to step 10.

In the step A10, control means 11 judges whether the concerned job has been completed or not. The control means 11 recognizes image forming relating to the last page, from end information E1 of job 1. After that, the sequence advances to step A11 where it is detected whether the following job 2 is reserved or not. In this example, job 2 is reserved as shown in FIG. 3. Therefore, the sequence goes back to step A3 and processing operations of step A3–step A10 stated above are repeated, because the following job 2 is reserved. Incidentally, when no job is reserved in step A11, the sequence advances to step A12 where driving systems such as photoreceptor drum 71 and a conveyance motor are stopped.

In the compound machine 100 to which the first image forming apparatus relating to the present embodiment, when a plurality of job 1–job 3 including image forming processing are registered in reserved job registration memory 22 as stated above, reservation of jobs registered in the reserved job registration memory 22 is controlled by control means 11, and jobs registered in the reserved job registration memory 22 are executed in succession. In addition, when another job 2 is reserved and registered after job 1 that is being executed presently in the reserved job registration memory 22, the following reserved and registered job 2 is prepared in the course of image forming processing for the last page of the concerned job 1, and the first recording sheet 30 for the reserved and registered job 2 is controlled by control means 11 to be fed continuously, following the recording sheet subjected to image forming processing for the last page of the concerned preceding job.

Therefore, it is possible to conduct image forming processing for the reserved and registered job continuously, following the recording sheet subjected to image forming processing for the last page of the concerned job, without stopping driving systems such as developing section 73, photoreceptor drum 71 and conveyance mechanism 77 all relating to image forming processing after each termination of the job being executed presently.

In addition to the operations to stop the aforesaid driving systems, neutralizing operations to neutralize electric charges on photoreceptor drum 71 after image forming and operations to turn off power supply for charging section 72 both are included in the termination operations for the concerned job 1, and an operation to turn on power supply to charging section 72 which is one of startup operations for the following reserved and registered job 2, do not need to be conducted. It is therefore possible to control so that image forming operations for job 1 are conducted after the startup operations (start driving the driving systems and start supplying power supply to the charging section) for job 1, and then, termination operations (stop driving the driving systems, neutralizing of photoreceptor and stop supplying power supply to the charging section) are conducted after image forming operations for job 2 are conducted.

Further, as another example, it is also possible to conduct image forming operations continuously by omitting termination operations and startup operations for each job when single-sided print mode and double-sided print mode agree with each other, with regard to plural jobs stored in print control memory 24. By doing this, hobs are easily controlled, and it is possible to simplify the composition of the control program. Without being limited to the occasion where single-sided print mode and double-sided print mode agree with each other, it is naturally possible to continuously conduct image forming operations of jobs even when the aforesaid two modes do not agree with each other. In that case, it is possible to increase productivity of images independently of print modes.

Further, when an image forming apparatus is equipped with a finisher unit wherein plural sheet ejection trays are provided, it is also possible to continuously conduct image forming operations, only when a sheet ejection tray designated by the job being executed currently agrees with a sheet ejection tray designated by the following job stored in the memory. By constituting in the aforesaid way, it is easy to control jobs each being equipped with a finisher unit, and the structure of the control program can be simplified. It is also possible to continuously conduct image forming operations only when contents to be processed by a finisher unit such as, for example, staple processing and shift processing in the job being executed currently agree with those in the following job. By constituting in that way, it is easy to control jobs, and the structure of the control program can be simplified, even in the case of an apparatus wherein various finishing works can be designated.

In the image forming apparatus equipped with plural sheet feeding trays, it is also possible to continuously conduct image forming operations only when a sheet feeding tray designated by the job being executed currently agrees with that designated by the following job. By constituting in that way, it is easy to control jobs, and the structure of the control program can be simplified, even in the case of an apparatus equipped with plural sheet feeding trays. Further, in the case of an apparatus wherein recording sheets in various sizes are loaded in sheet feeding trays, it is also possible to continuously conduct image forming operations only when a recording sheet size designated by the job being executed currently agrees with that designated by the following job. By constituting in that way, it is easy to control jobs, and the structure of the control program can be simplified, even in the case of an apparatus where recording sheets in various sizes can be set.

When conducting continuously image forming operations relating to plural jobs, it is also possible to control so that feeding of the first recording sheet in the following job may be started after the sensor detects that the last recording sheet in the job being executed currently has been ejected out. By controlling in that way, even when a jam is caused before the last recording sheet in the job being executed currently has been ejected out, sheet feeding for the recording sheet in the following job has not been started at that time. Therefore, it is possible to prevent that the recording sheet is wasted and jam clearance is made to be complicated. Further, if it is controlled to start sheet feeding for the first recording sheet in the following job after the sensor detects that the last recording sheet in the job being executed currently has been ejected out of the finisher unit, in the same way as in the foregoing, even in the case where the finisher unit is provided, the recording sheet is not wasted and jam clearance is easy, even when a jam is caused on the last recording sheet in the job being executed currently.

Incidentally, in the conventional system, when a start button is pressed to execute job 1, start signal SS shown in FIG. 7A is started up, and the driving system is turned on from the off state. Then, when the job 1 is ended, the driving system is turned off. To execute job 2 following the job 1, the driving system is turned on from the off state. Then, when the job 2 is ended, the driving system is turned off. On the contrary, in the invention, when start button 911 is pressed, start signal SS shown in FIG. 7B is started up, and the driving system is turned on from the off state. At the moment when the job 1 is ended, the driving system is not turned off to be on the state of on continuously, and sheet feeding, second sheet feeding and sheet ejection are conducted continuously.

Due to this, time for the suspension of motors for a photoreceptor drum and conveyance mechanism and time for restarting which are required between two jobs in the conventional system are eliminated. Therefore, the time required for image processing for a plurality of job 1, job 2 and job 3 . . . can be shortened, and thus, the user's request of "getting prints quickly" can be fully satisfied. Productivity in copying function in the compound machine 100 can be enhanced.

(2) Second Embodiment

When one print job is ended, image data in image memory 7 are erased each time. Therefore, when prints are desired again based on the print job executed in the past, the document relating to the print job needs to be read again (in the printer function, data transmission needs to be received again), which requires wasteful time and labor.

The second image forming apparatus of the invention is characterized to be equipped with a storage means which stores image data and operation setting information for the job relating to the preceding image forming processing as hysteresis information, a selection means which is operated to select image data and operation setting information for a given job from hysteresis information stored in the storage means, an image forming means which forms images on a sheet based on the image data and operation setting information for the job selected by the selection means, and a control means which erases image data and operation setting information for the job in the order wherein the oldest hysteresis information stored in the storage means comes first.

In the second image forming apparatus of the invention, image data and operation setting information for-the job relating to the preceding image forming processing are stored in the storage means as hysteresis information. With regard to the hysteresis information stored in the storage means, image data and operation setting information for the job are erased by the control means in the order wherein the oldest one comes first.

Therefore, when the selection means is operated by a user so that image data and operation setting information for a given job may be selected from hysteresis information remaining in the storage means, an image based on image data and operation setting information for the job selected by the selection means is formed on a sheet by the image forming means. Due to this, when a user executes again the job which was executed by the user before, it is possible to conduct image forming processing again by using image data and operation setting information for the job read out of the storage means, within a range of image data and operation setting information for the job remaining in the storage means, even when no document exists actually.

Figure 8:
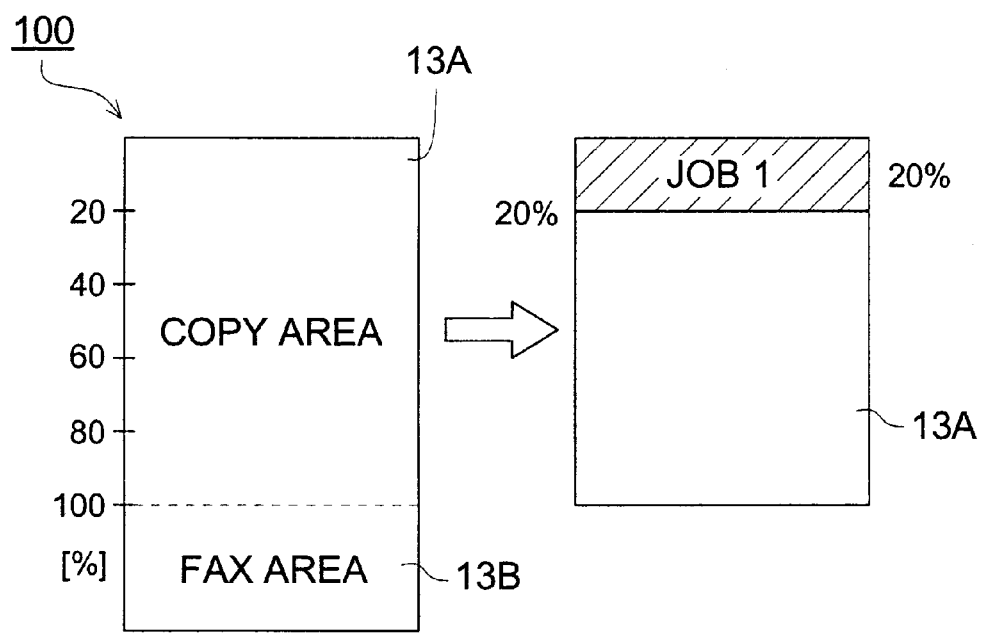
FIG. 8 is an image diagram showing an example of control (part 1) of copy area 13A relating to execution of a print job by compound machine 100 representing the second embodiment of the invention.
Figure 9:
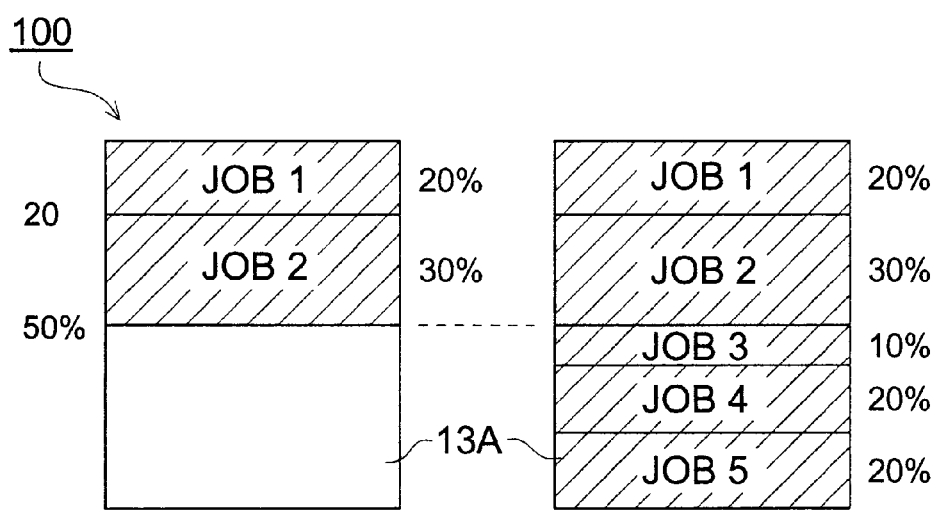
FIG. 9 is an image diagram showing an example of control (part 2) of copy area 13A relating to execution of a print job.
Figure 10:
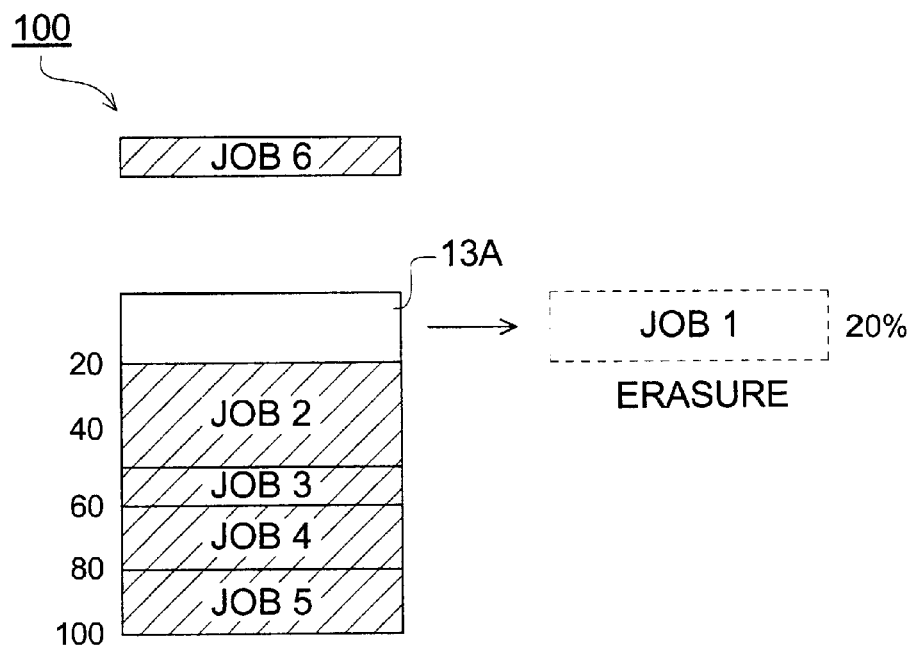
FIGS. 10(A) and 10(B) represent image diagrams showing examples of control (part 3) of copy area 13A relating to execution of a print job which are symbolized respectively with A and B.
Figure 10:
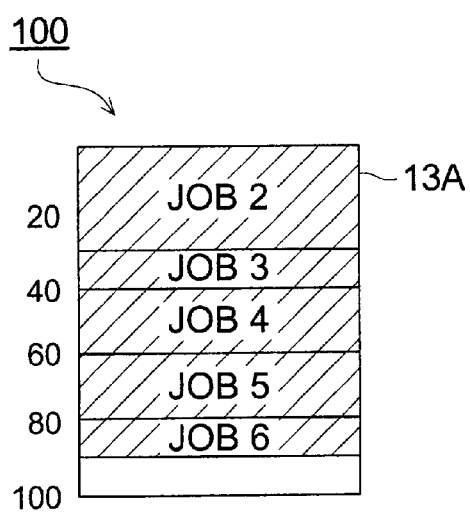
Figure 11:
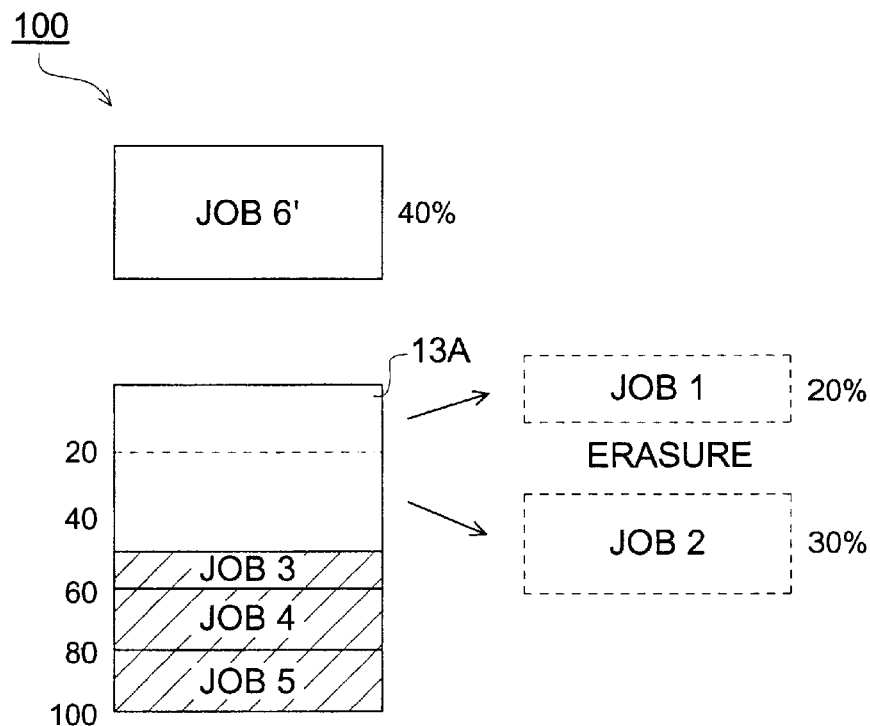
FIGS. 11(A) and 11(B) represents image diagrams showing examples of control (part 4) of copy area 13A relating to execution of a print job which are symbolized respectively with A and B.
Figure 11:
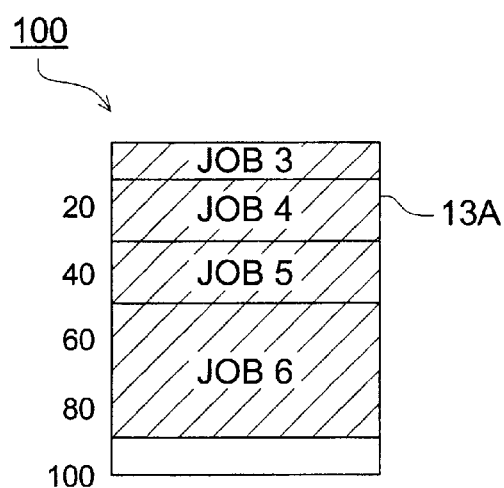

FIG. 8 is an image diagram showing an example of control (part 1) of copy area relating to execution of a print job by compound machine 100 representing the second embodiment of the invention. Each of FIG. 9–FIG. 11 is an image diagram showing an example of control (part 2) of copy area relating to execution of a print job.

In this example, control means 11 which erases image data and operation setting information respectively from image memory 13 and print control memory 24 is provided so that image data and operation setting information for the job may be erased in the order wherein the oldest hysteresis information comes first, with regard to image data and operation setting information for the job relating to the preceding image forming processing, and it is possible to execute again the hysteresis job by reading out image data and operation setting information, within a range of image data and operation setting information for the job remaining in the image memory 13 and print control memory 24, even when no document exists actually, when a user executes again the job which was executed by the user before.

The compound machine 100 representing the second embodiment is one to which the second image forming apparatus of the invention is applied. In the image memory (storage means) 13 stated above, there are stored image data of the job relating to the preceding image forming processing as they are as hysteresis information, and in print control memory (storage means) 24, there is stored operation setting information relating to the job as it is as hysteresis information.

Further, to control means 11, there is connected operation means 19 representing a selection means which is operated to select image data and operation setting information for a given job from hysteresis information stored in image memory 13 and print control memory 24. In this example, hysteresis information is displayed on display means 21 shown in FIG. 1 so that selection operations for the hysteresis job may be conducted smoothly. Based on image data and operation setting information for the job selected by the operation means 19, an image is formed on recording sheet 30 by image forming means 17.

Incidentally, the control means 11 controls memories so that image data may be erased from image memory 13 in the order wherein the oldest hysteresis information comes first, and operation setting information for the job may be erased from print control memory 24.

For example, memory quantity of copy area 13A in image memory 13 shown in FIG. 8 is displayed in percentage. In this case, 100% shows whole memory quantity of copy area 13A, and when storing image data relating to a certain job, "hysteresis job xx%" means that xx% of memory quantity of copy area 13A is to be used. With regard to FAX area 13B, its explanation will be omitted below.

In the example shown in FIG. 8, image data of hysteresis job 20% are stored first in image memory 13 which is initially in the state of empty (100%). At this moment, remaining quantity of image memory 13 is 80%. After that, print job 2 is executed secondly, and image data relating to hysteresis job 30% shown in FIG. 9 are stored, and in the same way, image data relating to hysteresis job 10% are stored as the third print job 3, then, image data relating to hysteresis job 20% are stored as the fourth print job 4, and image data relating to hysteresis job 20% are stored as the fifth print job 5, thus, there is assumed an occasion wherein image memory 13 has been filled.

There will be explained the following occasions under the condition of the filled image memory.

(1) An occasion wherein an occupied memory area relating to the new hysteresis job is smaller than a memory area by image data relating to one job to be erased.

For example, there is assumed an occasion to store, in image memory 13, image data relating to print job 6 that uses memory quantity 10% as new hysteresis job (corresponding to the sixth) shown in FIG. 10A. Since hysteresis information is erased in the order wherein the oldest hysteresis information comes first, in the invention, image data relating to hysteresis job 20% stored first and shown in FIG. 10A are erased first. Then, image data relating to new print job 6 are stored as hysteresis job 10% in the memory area which is vacant after image data relating to hysteresis job 20% have been erased.

In this case, it is also possible to store image data of hysteresis job 10% relating to print job 6 in the vacant memory area which is produced in the lowest position when hysteresis job 30% relating to print job 2, hysteresis job 10% relating to job 3, hysteresis job 20% relating to job 4, and hysteresis job 20% relating to print job 6 are shifted to the upper positions as shown in FIG. 10B. After that, image data to be erased can always be erased from the uppermost position of the memory area.

(2) An occasion wherein an occupied memory area relating to the new hysteresis job is greater than a memory area by image data relating to one job to be erased.

For example, there is assumed an occasion to store, in image memory 13, image data relating to print job 6' that uses memory quantity 40% as new hysteresis job (corresponding to 6'th) shown in FIG. 11A. Even in this case, image data relating to hysteresis job 20% stored first and shown in FIG. 11A and image data relating to hysteresis job 30% which are the second oldest and stored secondly are erased, because hysteresis information is erased in the order wherein the oldest hysteresis information comes first. Then, image data relating to new print job 6' are stored as hysteresis job 40% in the memory area which is vacant after image data relating respectively to hysteresis job 20% and hysteresis job 30% have been erased.

In this case, it is also possible to store image data of hysteresis job 40% relating to print job 6'0 in the vacant memory area which is produced in the lowest position when hysteresis job 10% relating to print job 3, hysteresis job 20% relating to job 4 and hysteresis job 20% relating to job 5 are shifted to the upper positions as shown in FIG. 11B. The reasons for the foregoing are as stated above.

Next, an example of operations (in the course of storing image data) of compound machine 100 representing the second embodiment will be explained. In this example, each of image memory 13 and print control memory 24 is provided with a memory area in prescribed quantity, and there is assumed an occasion wherein control means 11 erases image data relating to the job from image memory 13 in the order wherein the oldest hysteresis information comes first, when the new job is given, then, erases operation setting information of the job from print control memory 24, and stores image data relating to the new job and operation setting information into the memory area from which the image data have been erased. Incidentally, with regard to the operation setting information to be erased from print control memory 24, the explanation thereof will be omitted because the information is erased simultaneously with image data of the job.

Figure 12:
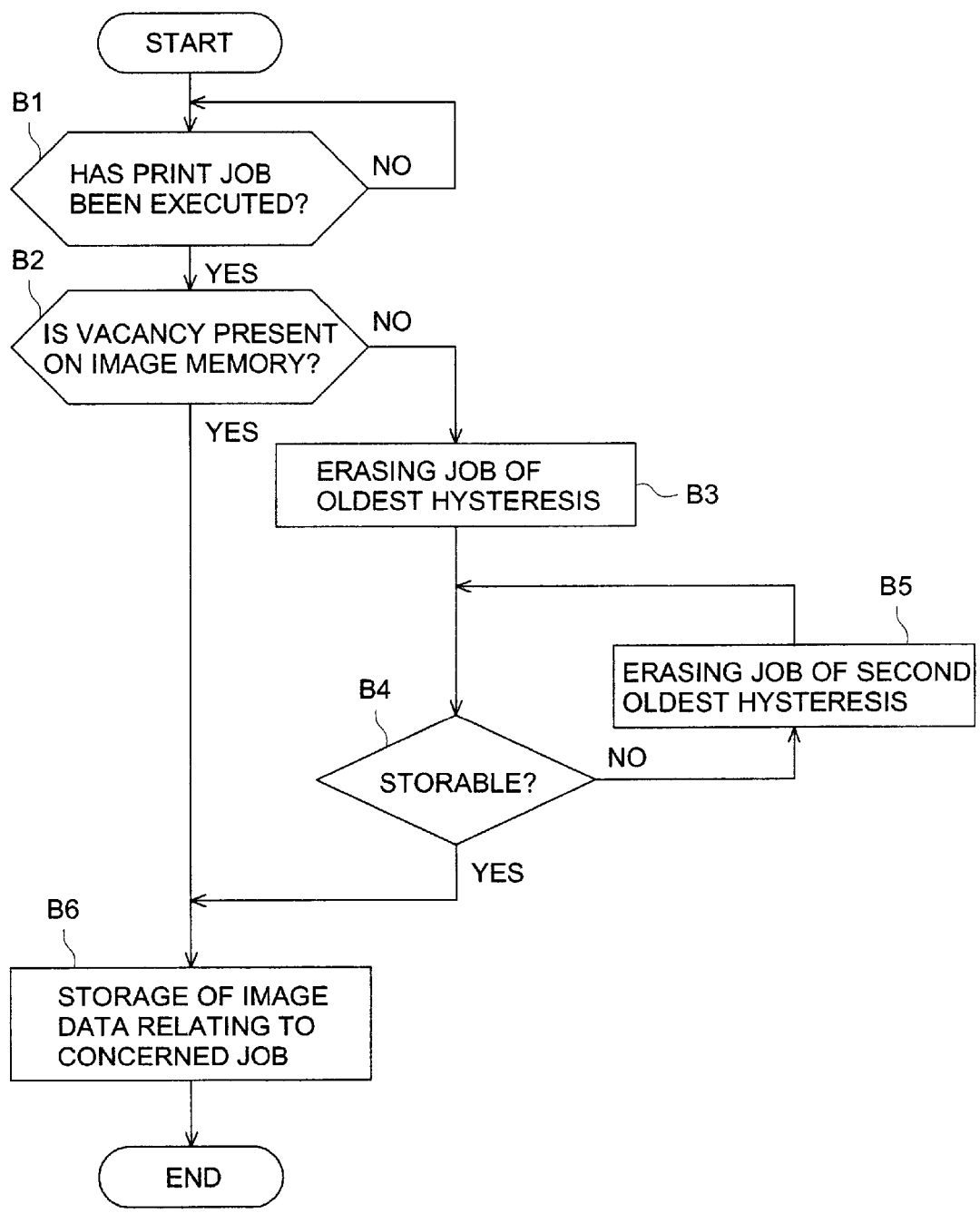
FIG. 12 is a flow chart showing an example of operations (for storing image data) of the compound machine 100 representing the second embodiment.

With the foregoing serving as an assumption, control means 11 first waits, at step B1 of flow chart shown in FIG. 12, that print job is executed. In this case, a user presses start button 911 on operation panel 90 shown in FIG. 2 for executing the print job. When the start button 911 is pressed, the sequence advances to step B2 where the control means 11 checks whether a vacancy exists on image memory 13 or not.

In this case, when a vacancy exists on image memory 13 as shown in FIG. 8, the sequence moves to step B6 where image data relating to the print job are stored. When the image memory 13 is entirely occupied as shown in FIG. 9, the sequence moves to step B3 where the oldest hysteresis job is erased. Then, in step B4, it is judged whether image data relating to print job can be stored in the memory area or not. When the image data can be stored, the image data relating to print job is stored in image memory 13 at step B6.

When the memory area that is resulted from the first erasure of the hysteresis job is too small to store image data relating to print job, the sequence moves to step B5 where the second oldest hysteresis job is erased. After that, the sequence moves again to step B4 where it is judged whether the image data relating to the print job can be stored in memory areas produced firstly and secondly or not. When the image data relating to the print job can be stored, the sequence moves to step B6 where the image data relating to the print job are stored.

In this example, hysteresis jobs are displayed on display means 21. Therefore, image data relating to the latest print job obtained by detecting hysteresis jobs from the present time to the past are read out, and images based on the image data are formed by image forming means 17.

In the compound machine 100 to which the second image forming apparatus relating to the present embodiment is applied, image data of the job relating to preceding image forming processing are stored in image memory 13 as they are as hysteresis information, and operation setting information of the job is stored in print control memory 24 as hysteresis information. The hysteresis information stored in the image memory 13 and in the print control memory 24 are erased by the control means 11 in the order wherein the oldest information comes first.

Therefore, when operation means 19 is operated by a user so that image data and operation setting information of a given job may be selected from hysteresis information remaining in the image memory 13 and print control memory 24, images based on the image data and operation setting information of the job selected by the operation means 19 are formed by the image forming apparatus 17.

Due to this, when a user executes again the job which was executed by the user before, it is possible to conduct image forming processing again by using image data of the job read out of image memory 13 and operation setting information read out of print control memory 24, within a range of image data and operation setting information remaining in the image memory 13 and print control memory 24, even when no document exists actually. It is possible to reduce wasteful time and labor relating to operations of the user.

(3) Third Embodiment

FIG. 13 is an image diagram showing an example of display by display means 21 of compound machine 100 representing the third embodiment. In this example, when storing image data and operation setting information of the job including image forming processing as hysteresis information, a password is added to meet the user's request, and this password is confirmed when the job is executed again, and if the password is wrong, reading of the image data and operation setting information is prohibited to protect secrecy of the image data of the job. Hereinafter, this function is called a function to protect with a password.

Compound machine 100 representing the third embodiment is one to which the second image forming apparatus of the invention is applied. In the image memory 13 stated above, there are stored image data of the job relating to the image forming processing in this time as they are as hysteresis information, and a password is added to the image memory 13 to satisfy the user's request. The password is naturally added also to operation setting information relating to the job with regard to print control memory 24, and is stored as hysteresis information.

To the control means 11, there is connected operation means 19 representing a password setting means, and there is established a password to read out image data and operation setting information for the specific job from hysteresis information stored in image memory 13 and print control memory 24. A password is established by using ten-key "0"–"9", "*" and "#" on operation panel 90 shown in FIG. 2. For example, passwords #01234* for job 1 and #56780* for job 2 . . . are established.

These passwords are added to protect secrecy of image data relating to the job, and they function for user confirmation. Establishment of a password is left on a user, and in this example, a password effect setting means is provided to set validity or invalidity of the establishment of a password. For example, a display switch (DISPSW) is used for the setting. Stop/clear button 98 shown in FIG. 2 may also be used as a password effect setting means.

For the smooth operation to select hysteresis jobs, hysteresis job list image plane P1 is displayed on display means 21 shown in FIG. 13 in this example. For example, for job 1, there are displayed a file name, contents of operation setting information, a password and a tag for execution. In the same way, a file name, contents of operation setting information, a password and a tag for execution are displayed for each of job 2–job 4 . . .

When a tag of a file name relating to hysteresis job 1 is touched on hysteresis job list image plane P1 shown in FIG. 13, hysteresis job 1 display image plane P2 shown in FIG. 14 appears and the jobs executed in the past can be confirmed. In this example, there is displayed a message saying "This is an image on the first page of hysteresis job 1. This is a job executed at xx minutes after xx o'clock on xx day of xx month in year xx." Together with this, print image Px on the first page is displayed. The print image Px may either be displayed on the entire page of a recording sheet, or its forefront portion only may be displayed, provided that the job executed in the past can be confirmed.

Figure 15:
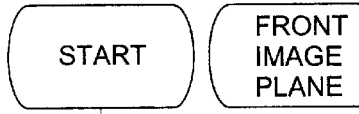
FIG. 15 is an image diagram showing an example of contents of operation setting information of hysteresis job 1.

In addition to the message and print image Px, tag T1 of "Preceding image plane" is displayed on job 1 display image plane P2, and when this tag T1 is touched, the display returns to hysteresis job list image plane P1 shown in FIG. 13. When a "content" tag of operation setting information for hysteresis job 1 is touched on the hysteresis job list image plane P1, the display is switched from hysteresis job list image plane P1 shown in FIG. 13 to operation setting image plane P3 of hysteresis job 1 shown in FIG. 15 so that operation setting information of job 1 established in the past can be confirmed. In this example, there is displayed a message saying "This is an establishment content for hysteresis job 1. If you agree with the following establishment, press the copy start button."

Together with the aforesaid message, the following pieces of information are displayed on operation setting image plane P3 of the hysteresis job 1.

Copy mode: Single-sided—double-sided RADF

Copy paper: Automatic paper selection

Copy magnification: 1/1

Copy density: Normal

Sheet ejection: Sort

Applied function: None

On the operation setting image plane P3, there are displayed tag T2 of "Preceding image plane" and tag T3 of "Start" in addition to the message and contents of setting in the past, and when the tag T2 is touched, the display returns to hysteresis job list image plane P1 shown in FIG. 13. In this example, when input of password "#01234*" relating to hysteresis job 1 is conducted, the password is confirmed by control means 11. This confirmation method is conducted by comparing the password "#01234*" relating to the hysteresis job 1 registered in the previous time with the password "#01234*" inputted by the user this time, and thereby, by judging whether both passwords agree with each other or not. When both passwords agree with each other, reading out of image data and operation setting information for the hysteresis job 1 is permitted. When both passwords are different mutually and do not agree with each other, reading out of the image data and operation setting information is prohibited. Due to this, secrecy of image data relating to the job can be protected.

Therefore, when tag T3 of "Start" on the display image plane is touched when both passwords agree with each other, it is possible to make the print function to operate. It is also naturally possible to make the print function to operate by touching a tag for execution shown in FIG. 13. Through operations of this print function, an image is formed on recording sheet 30 by image forming apparatus 17 based on image data and operation setting information of the job.

Next, there will be explained an example of operations (in the course of executing a hysteresis job) of compound machine 100 representing the third embodiment. In this example, when image data and operation setting information of a job including image forming processing are stored, a password is added to satisfy user's request, and the password is confirmed when the job is executed again. If the password is wrong, the number of confirmations for one job is decided, for example, to be N=3, and when this number is exceeded, reading out of image data and operation setting information is prohibited, and an occasion to conduct warning processing is assumed.

Figure 16:
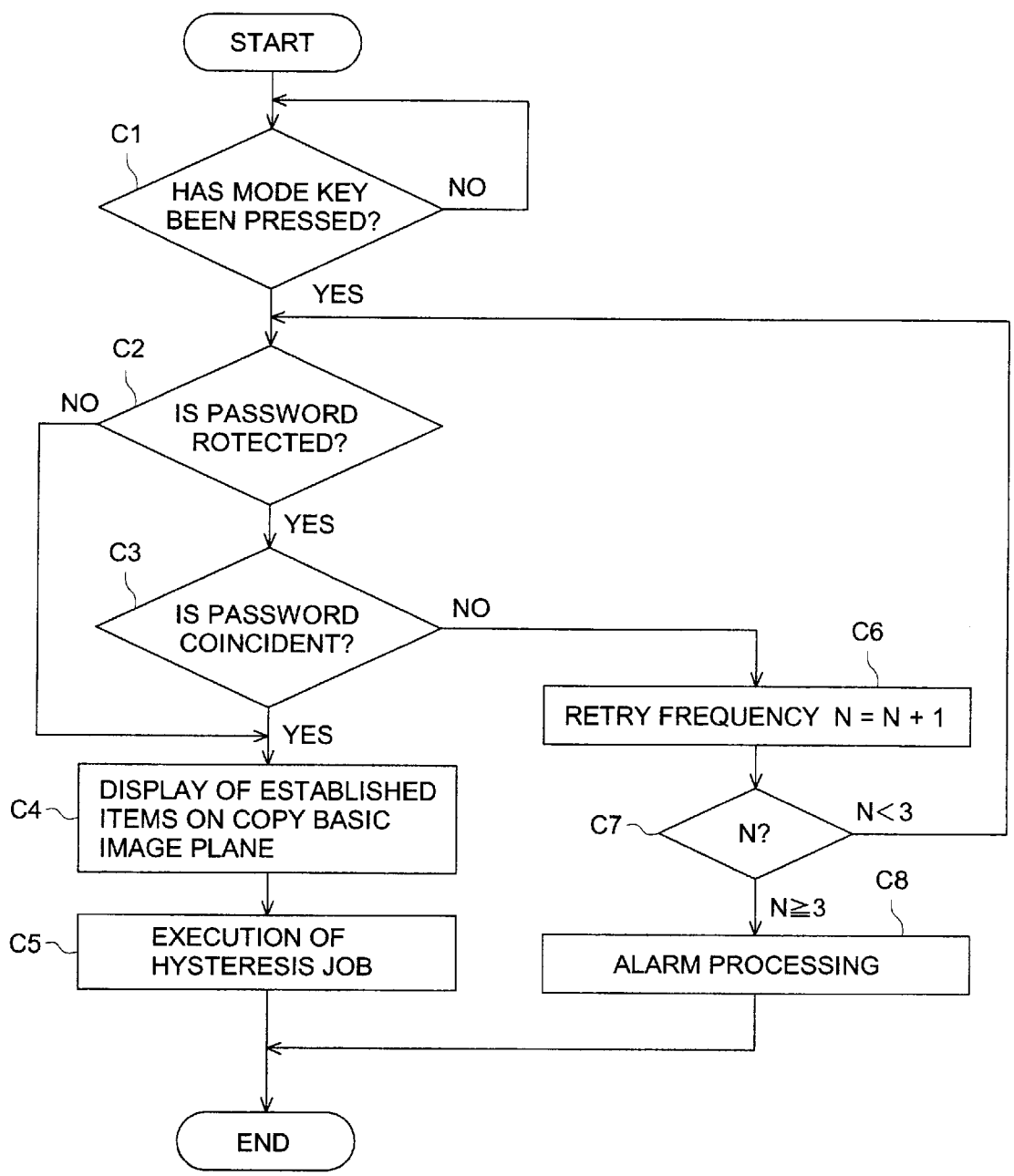
FIG. 16 is a flow chart showing an example of operations (in the course of executing a hysteresis job) of the compound machine 100 representing the third embodiment.
Figure 17:
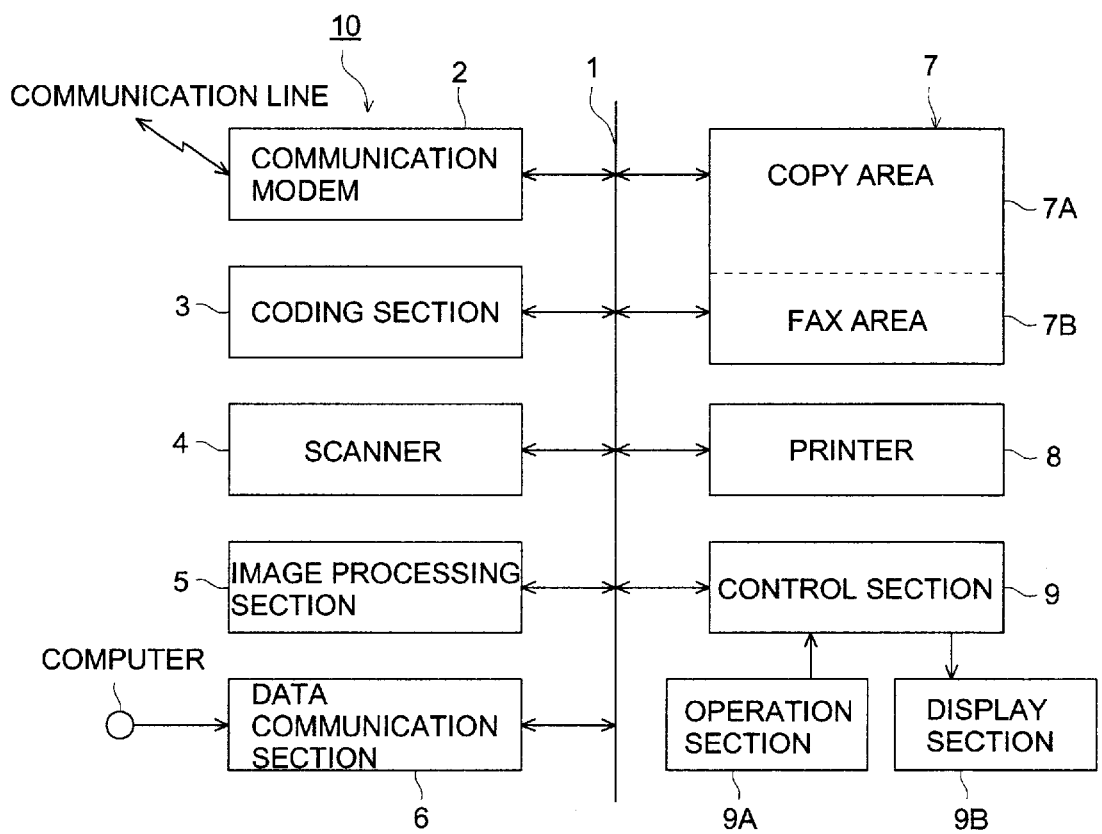
FIG. 17 is a block diagram showing an example of structure of compound machine 10 of a conventional type.
Figure 18:
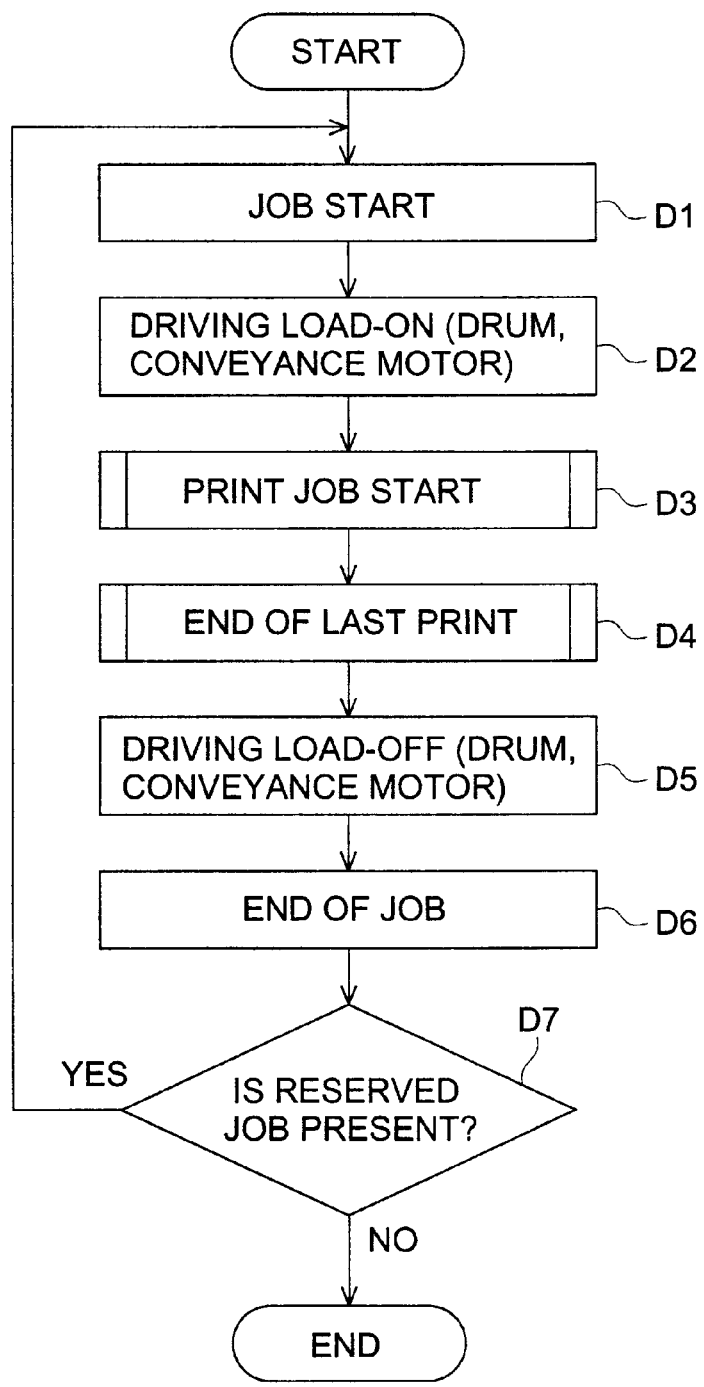
FIG. 18 is a flow chart showing an example of operations of the compound machine 10.

With the foregoing serving as an assumption, control means 11 first waits, at step C1 of flow chart shown in FIG. 16, that mode key 23 relating to image forming processing is pressed. When the mode key 23 is pressed, the sequence moves to step C2 where control means 11 judges whether the protect function concerning the password has been established or not. When the password is inputted by a user within a certain period of time, it is judged that the protect function has been established.

When the password is inputted, therefore, the sequence moves to step C3 where the password controlled by the control means 11 is compared with the password inputted by the user. When both passwords agree with each other, the sequence moves to step C4. Even in the case when the protect function is judged, in step C2, not to be established, the sequence moves to step C4 where hysteresis job 1, hysteresis job 2, hysteresis job 3 and hysteresis job 4 . . . are displayed on a job setting image plane shown in FIG. 13. After that, the sequence moves to step C5 where the hysteresis job requested by the user is executed.

If both passwords do not agree in step C3, the sequence moves to step C6 where retry frequency N is incremented by +1, and then, the sequence moves to step C7 where the retry frequency N is checked whether it satisfies N<3 or not. In the case of N<3, the sequence moves back to step C2 where password input is accepted again. When the retry frequency N shows N≧3 in step 7, the sequence moves to step C8 where alarm processing is conducted. Though the message of "The password is wrong." is displayed on the display means 21 for the alarm processing, the warning processing by voice information may also be conducted together with the message mentioned above.

As stated above, the compound machine 100 representing the third embodiment is provided with a protection function by means of a password, and when storing image data and operation setting information for the job including image forming processing, a password is added to meet the user's request. The password is confirmed when the job is executed, and when the password is wrong, reading out of the image data and operation setting information is prohibited. In addition, when the retry processing is conducted, exceeding its specified number of frequency, alarm processing is conducted.

Therefore, even if a password-ignorant person tries to execute a hysteresis job, image forming processing for the hysterisis job is not conducted, thus, secrecy of image data relating to the specific job can be protected. Even when the document of the secrecy protection is lost, it is possible to conduct again the image forming processing relating to the document of the secrecy protection, if the image forming processing is within a range of the image data and operation setting information for the job remaining in the image memory 13 and print control memory 24, and the password of the user is known.

As explained above, the first image forming apparatus of the invention is provided with a control means which controls reservation of jobs each including image forming processing and executes the jobs in succession, and when another job is reserved and registered after the job being executed presently, the reserved and registered job is started in the course of image forming processing for the last page in the concerned job, and the first sheet for the reserved and registered job is controlled to be fed in succession to the recording sheet for image forming processing of the last page of the concerned job.

Owing to the structure mentioned above, it is possible to conduct image forming processing of the reserved and registered job in succession, following the recording sheet for image forming processing of the last page in the concerned job, without stopping driving systems such as a developing unit, a drum and a conveyance belt relating image forming processing at each termination of the job being executed presently. Due to this, it is possible to enhance productivity of a compound machine to which the image forming apparatus is applied.

The second image forming apparatus of the invention is one that is equipped with a control means which erases image data and operation setting information of the job from a storage means in the order wherein the oldest hysteresis information comes first, with regard to image data and operation setting information of the job relating to the preceding image forming processing.

When a user executes again the job which was executed by the user before, the structure mentioned above make it possible to conduct image forming processing again by using image data and operation setting information of the job read out of a storage means, within a range of image data and operation setting information of the job remaining in the storage means, even when a document does not exist actually.

The present invention is extremely suitable when it is applied to a copying machine and a compound machine each being equipped with control function for a job including image forming processing.

What is claimed is:

1. An image forming apparatus, comprising:
an image forming section to form an image, said image forming section including:
a photoreceptor,
a charging unit to charge the surface of said photoreceptor, and
a discharging unit to discharge the surface of said photoreceptor;
a sheet-feeding/conveyance section to convey a recording sheet;
a controlling section to control said image forming section and said sheet-feeding/conveyance section; and
a memorizing section to memorize jobs reserved for image forming processing;
wherein said image forming processing for one of said jobs includes a startup operation, an image forming operation and a terminating operation, and, when said memorizing section memorizes a next job to be executed after a current job, which is currently executed in said image forming apparatus, said controlling section controls said image forming processing so as to perform said image forming operation for said next job succeeding that for said current job, without performing said terminating operation for said current job and said startup operation for said next job; and
wherein said startup operation includes a rotation startup action for commencing rotation of said photoreceptor, a charge startup action for commencing supply of electric power to said charging unit and a sheet-feeding/conveyance startup action for commencing driving of said sheet-feeding/conveyance section, while said terminating operation includes a rotation stoppage action for stopping the rotation of said photoreceptor, a discharging action for discharging the surface of said photoreceptor by means of said discharging unit, a charge stoppage action for stopping supply of said electric power to said charging unit and a sheet-feeding/conveyance stoppage action for stopping driving of said sheet-feeding/conveyance section.

2. The image forming apparatus of claim 1,
wherein, in a case wherein said memorizing section memorizes two said jobs including said current job and said next job, said controlling section first executes said current job by performing said startup operation and by successively performing said image forming operation, and then said controlling section executes said next job by directly performing said image forming operation without performing said startup operation for said next job, and finally performs said terminating operation.

3. An image forming apparatus, comprising:
an image forming section to form an image;
a sheet-feeding/conveyance section to convey a recording sheet;
a controlling section to control said image forming section and said sheet-feeding/conveyance section; and
a memorizing section to memorize jobs reserved for an image forming processing;
wherein said image forming processing for one of said jobs includes a startup operation, an image forming operation and a terminating operation and, when said memorizing section memorizes a next job to be executed after a current job, which is currently executed in said image forming apparatus, said controlling section controls said image forming processing so as to perform said image forming operation for said next job succeeding that for said current job, without performing said terminating operation for said current job and said startup operation for said next job; and
wherein said controlling section performs said image forming operation for said next job succeeding that for said current job without performing said terminating operation for said current job and said startup operation for said next job, only in such a case that said current job coincides with said next job in either a single-sided print mode or a double-sided print mode.

4. The image forming apparatus of claim 1,
wherein said controlling section performs said image forming operation for said next job succeeding that for said current job without performing said terminating operation for said current job and said startup operation for said next job, irrespective of whether or not said current job coincides with said next job in either a single-sided print mode or a double-sided print mode.

5. An image forming apparatus, comprising:
an image forming section to form an image;
a sheet-feeding/conveyance section to convey a recording sheet;
a controlling section to control said image forming section and said sheet-feeding conveyance section;
a memorizing section to memorize jobs reserved for an image forming processing; and
a finisher, having a plurality of delivery trays, to perform a finish-processing operation for said recording sheet on which said image is already formed;
wherein said image forming processing for one of said jobs includes a startup operation, an image forming operation and a terminating operation and, when said memorizing section memorizes a next job to be executed after a current job, which is currently executed in said image forming apparatus, said controlling section controls said image forming processing so as to perform said image forming operation for said next job succeeding that for said current job, without performing said terminating operation for said current job and said startup operation for said next job; and
wherein said controlling section performs said image forming operation for said next job succeeding that for said current job without performing said terminating operation for said current job and said startup operation for said next job, only in such a case that one of said delivery trays, which is currently employed for said current job, coincides with one of said delivery trays, which is designated to be employed for said next job.

6. An image forming apparatus, comprising:
an image forming section to form an image;
a sheet-feeding/conveyance section to convey a recording sheet;
a controlling section to control said image forming section and said sheet-feeding/conveyance section;
a memorizing section to memorize jobs reserved for an image forming processing; and
a finisher to perform various kinds of finish processing operations for said recording sheet on which said image is already formed;
wherein said image forming processing for one of said jobs includes a startup operation, an image forming operation and a terminating operation and, when said memorizing section memorizes a next job to be executed after a current job, which is currently executed in said image forming apparatus, said controlling section controls said image forming processing so as to perform said image forming operation for said next job succeeding that for said current job, without performing said terminating operation for said current job and said startup operation for said next job; and
wherein said controlling section performs said image forming operation for said next job succeeding that for said current job without performing said terminating operation for said current job and said startup operation for said next job, only in such a case that a kind of said finish-processing operation, which is designated to be performed for said current job, coincides with a kind of said finish-processing operation, which is designated to be performed for said next job.

7. An image forming apparatus, comprising:
an image forming section to form an image;
a sheet-feeding/conveyance section to convey a recording sheet;
a controlling section to control said image forming section and said sheet-feeding/conveyance section;
a memorizing section to memorize jobs reserved for an image forming processing; and
a plurality of sheet feeding trays to store said recording sheet;
wherein said image forming processing for one of said jobs includes a startup operation, an image forming operation and a terminating operation and, when said memorizing section memorizes a next job to be executed after a current job, which is currently executed in said image forming apparatus, said controlling section controls said image forming processing so as to perform said image forming operation for said next job succeeding that for said current job, without performing said terminating operation for said current job and said startup operation for said next job; and
wherein said controlling section performs said image forming operation for said next job succeeding that for said current job without performing said terminating operation for said current job and said startup operation for said next job, only in such a case that one of said sheet feeding trays, which is designated to be employed for said current job, coincides with one of said sheet feeding trays, which is designated to be employed for said next job.

8. An image forming apparatus, comprising:

an image forming section to form an image;

a sheet-feeding/conveyance section to convey a recording sheet;

a controlling section to control said image forming section and said sheet-feeding/conveyance section; and a memorizing section to memorize jobs reserved for an image forming processing;

wherein said image forming processing for one of said jobs includes a startup operation, an image forming operation and a terminating operation and, when said memorizing section memorizes a next job to be executed after a current job, which is currently executed in said image forming apparatus, said controlling section controls said image forming processing so as to perform said image forming operation for said next job succeeding that for said current job, without performing said terminating operation for said current job and said startup operation for said next job; and wherein said image forming apparatus stores a plurality of recording sheets having different sizes, and said controlling section performs said image forming operation for said next job succeeding that for said current job without performing said terminating operation for said current job and said startup operation for said next job, only in such a case that a size of said recording sheets, which is currently employed for said current job, coincides with a size of said recording sheets, which is designated to be employed for said next job.

9. An image forming apparatus, comprising:

an image forming section to form an image;

a sheet-feeding/conveyance section to convey a recording sheet;

a controlling section to control said image forming section and said sheet-feeding/conveyance section;

a memorizing section to memorize jobs reserved for an image forming processing; and a detector to detect that said recording sheet is delivered outside said image forming apparatus;

wherein said image forming processing for one of said jobs includes a startup operation, an image forming operation and a terminating operation and, when said memorizing section memorizes a next job to be executed after a current job, which is currently executed in said image forming apparatus, said controlling section controls said image forming processing so as to perform said image forming operation for said next job succeeding that for said current job, without performing said terminating operation for said current job and said startup operation for said next job; and wherein, in the case that said next job is memorized in said memorizing section, said controlling section commences to feed an initial recording sheet for said next job, after said detector detects a final recording sheet for said current job while executing said current job.

10. An image forming apparatus, comprising:

an image forming section to form an image;

a sheet-feeding/conveyance section to convey a recording sheet;

a controlling section to control said image forming section and said sheet-feeding/conveyance section;

a memorizing section to memorize jobs reserved for an image forming processing; and a finisher to perform a finish-processing operation for said recording sheet on which said image is already formed;

wherein said image forming processing for one of said jobs includes a startup operation, an image forming operation and a terminating operation and, when said memorizing section memorizes a next job to be executed after a current job, which is currently executed in said image forming apparatus, said controlling section controls said image forming processing so as to perform said image forming operation for said next job succeeding that for said current job, without performing said terminating operation for said current job and said startup operation for said next job; and wherein said finisher comprises a detector to detect that said recording sheet is delivered outside said image forming apparatus, and, in case that said next job is memorized in said memorizing section, said controlling section commences to feed an initial recording sheet for said next job, after said detector detects a final recording sheet for said current job while executing said current job.

* * * * *